US011816167B1

(12) United States Patent
Doyle et al.

(10) Patent No.: US 11,816,167 B1
(45) Date of Patent: Nov. 14, 2023

(54) KNOWLEDGE BASE PLATFORM

(71) Applicant: Ascent Technologies Inc., Chicago, IL (US)

(72) Inventors: Christopher Allan Doyle, Chicago, IL (US); Spencer Thomas Allee, Chicago, IL (US); Brian T. Clark, Chicago, IL (US)

(73) Assignee: Ascent Technologies Inc., Chicago, IL (US)

( * ) Notice: Subject to any disclaimer, the term of this patent is extended or adjusted under 35 U.S.C. 154(b) by 20 days.

(21) Appl. No.: 17/343,687

(22) Filed: Jun. 9, 2021

Related U.S. Application Data

(60) Provisional application No. 63/036,904, filed on Jun. 9, 2020.

(51) Int. Cl.
*G06F 16/93* (2019.01)
*G06N 5/022* (2023.01)

(52) U.S. Cl.
CPC ............ *G06F 16/93* (2019.01); *G06N 5/022* (2013.01)

(58) Field of Classification Search
CPC ........ G06N 20/10; G06N 20/00; G06N 3/084; G06N 5/022; G06F 16/93
See application file for complete search history.

(56) References Cited

U.S. PATENT DOCUMENTS 10,162,850 B1 * 12/2018 Jain ..................... G06N 20/00
2020/0302165 A1 * 9/2020 Dang ................... G06V 10/764

* cited by examiner

*Primary Examiner* — Hau H Hoang
(74) *Attorney, Agent, or Firm* — Morgan, Lewis & Bockius LLP

(57) ABSTRACT

An electronic computing system receives a document and identifies steps for processing the document. Each step is associated with a respective machine learning model trained to generate an output. The system subdivides content of the document into a plurality of chunks. For each step and for each chunk, the system applies the respective machine learning model to the chunk to generate an output and a confidence value. The system compares the confidence value to a threshold value. In accordance with a determination that the confidence value exceeds the threshold value, the system stores the output as final output for the chunk and the step. In accordance with a determination that the confidence value does not exceed the threshold value, the system requests user input for the chunk and the step, and the system stores received user input as final output for the chunk and step.

20 Claims, 20 Drawing Sheets

1038 For each step of the plurality of steps and for each chunk of the second plurality of chunks:

1052 For the first step of the plurality of steps: (i) respective output corresponding to a first subset, less than all, of the second plurality of chunks are stored as final output, and (ii) user input corresponding to a second subset, less than all, of the second plurality of chunks are stored as final output. The second subset of the second plurality of chunks is distinct from the first subset of the second plurality of chunks. The first subset of the first plurality of chunks includes a different number of chunks than the first subset of the second plurality of chunks.

1054 The first subset of the second plurality of chunks includes more chunks than the first subset of the first plurality of chunks.

Figure 10E

KNOWLEDGE BASE PLATFORM

RELATED APPLICATIONS

This application claims priority to U.S. Provisional Patent Application Ser. No. 63/036,904, filed Jun. 9, 2020, entitled "Knowledge Base Platform," which is incorporated by reference herein in its entirety.

This application is related to U.S. patent application Ser. No. 15/697,142, entitled "System and Interface for Generating Real-Time Regulatory Compliance Alerts Using Modularized and Taxonomy-Based Classification of Regulatory Obligations," filed on Sep. 6, 2017, which is incorporated by reference herein in its entirety.

TECHNICAL FIELD

This application relates generally to the production of knowledge insights from data sets, including methods and systems for improving efficiency by determining how to assign various tasks between automated and manual processing based on risk assessments associated with those tasks.

BACKGROUND

Artificial Intelligence (AI) aids in the process of ascertaining useful insights from large data sets. There have been many improvements to the accuracy of AI techniques in recent years. However, these improvements often come at the cost of low efficiency.

Businesses may use machine intelligence to automate certain tasks (e.g., repetitive tasks) while using human intelligence for other tasks that may require higher accuracy than is provided from machine intelligence. This binary approach requires businesses to choose between the speed of machine intelligence versus the accuracy of human intelligence when determining whether to assign a task for automation or for manual processing.

Some fields have relatively low accuracy requirements. For example, in the field of marketing, 85% accuracy may be acceptable. However, in some "knowledge" disciplines, outcomes may be more risk-based or liability-based, and nearly 100% accuracy may be required. As a result, machine intelligence is rarely used. Very high accuracy in such fields could be achieved by machine intelligence if there were a nearly infinite amount of data, but this is not achievable.

Therefore, businesses in knowledge-based fields generally have difficulty implementing AI-based automation techniques because the binary approach (the use of either human or machine intelligence) is neither sufficiently accurate nor efficient.

SUMMARY

Implementations described in this specification are directed to providing an analytics process pipeline, which is a software solution that allows for human and machine intelligence to work together to produce insights cooperatively. This approach increases the impact of even low-level machine models and allows for practical automation.

The solution allows users to define steps in a process and quickly iterate and automate those steps, regardless of the complexity or difficulty of the task. This hybrid model approach means that humans can leverage machine intelligence for automated processing, and the remaining work can be assigned for manual processing by humans.

In accordance with some implementations, a method is executed at an electronic computing device having one or more processors and memory storing one or more programs configured for execution by the one or more processors. The method includes receiving a first document, and identifying a sequential plurality of steps to process the first document. Each step of the plurality of steps is associated with a respective machine learning model trained to generate a respective output. The method also includes subdividing content of the first document into a first plurality of chunks. The method further includes, for each step of the plurality of steps and for each chunk of the first plurality of chunks, applying the respective machine learning model to the respective chunk to generate a respective output and to generate a respective confidence value for accuracy of the respective output, and comparing the respective confidence value to a respective first threshold confidence value. When the respective confidence value exceeds the respective first threshold confidence value, the system stores the respective output as final output for the respective chunk and respective step. When the respective confidence value does not exceed the respective first threshold confidence value, the system transmits an alert requesting user input for the respective chunk and the respective step, and in response to receiving the requested user input, the system stores the user input as final output for the respective chunk and respective step.

In some implementations, for a first step of the plurality of steps, respective output corresponding to a first subset (e.g., a subset, less than all) of the first plurality of chunks are stored as final output, and user input corresponding to a second subset (e.g., a subset, less than all) of the first plurality of chunks are stored as final output. The second subset of the first plurality of chunks is distinct from (e.g., different from, non-overlapping with) the first subset of the first plurality of chunks.

In some implementations, the method also includes receiving a second document, and subdividing content of the second document into a second plurality of chunks. The method further includes, for each step of the plurality of steps and for each chunk of the second plurality of chunks, applying a machine learning model associated with the first step to the respective chunk to generate a respective output and to generate a respective confidence value for accuracy of the respective output, and comparing the respective confidence value to a respective second threshold confidence value. When the respective confidence value exceeds the respective second threshold confidence value, the system stores the respective output as final output for the respective chunk and the first step. When the respective confidence value does not exceed the respective second threshold confidence value, the system transmits an alert requesting user input for the respective chunk and the first step, and in response to receiving the requested user input, stores the user input as final output for the respective chunk and the first step.

In some implementations, the respective second threshold confidence value is different from the respective first threshold confidence value (e.g., the respective second threshold confidence value has a different value than the respective first threshold confidence value).

In some implementations, the method further includes using the user input as feedback to update the respective first threshold confidence value to the respective second threshold confidence value (e.g., the first threshold confidence value is updated based at least in part on the user input).

In some implementations, the method further includes, for the first step of the plurality of steps, storing respective output corresponding to a first subset (e.g., a subset, less than all) of the second plurality of chunks as final output, and storing user input corresponding to a second subset (e.g., a subset, less than all) of the second plurality of chunks as final output. The second subset of the second plurality of chunks is distinct from (e.g., different from, non-overlapping with) the first subset of the second plurality of chunks. In some instances, the first subset of the first plurality of chunks includes a different number of chunks than the first subset of the second plurality of chunks.

In some instances, the first subset of the second plurality of chunks includes more chunks than the first subset of the first plurality of chunks.

In some instances, the second plurality of chunks includes a different number of chunks than the first plurality of chunks (e.g., the second document was subdivided into a different number of chunks compared to the first document).

In some implementations, the plurality of steps further includes a second step that follows the first step, and the method further includes providing final output from the first step as input to the second step.

In some implementations, the method also includes updating the respective machine learning model using user input for the respective step as labeled training data.

In some implementations, for a third step of the plurality of steps and for each chunk of the plurality of chunks, the respective output is stored as final output for the third step.

In some implementations, the method further includes reviewing at least a sample (e.g., at least a portion, less than all) of final output for one of the of the plurality of steps, and providing user indication to accept the final output or to edit the final output.

In some implementations, the method also includes determining the respective first threshold confidence value based at least in part on a risk assurance value associated with the respective step.

In some implementations, the method also includes determining a level of liability associated with first step, and determining the risk assurance value associated with the respective step is based on the level of liability associated with first step.

In some implementations, the method further includes identifying one or more government regulations related to the respective step, identifying one or more consequences of not complying with the one or more government regulations, and determining the level of liability associated with respective step based at least in part on the one or more consequences of not complying with the one or more government regulations.

In some implementations, the method further includes determining an error rate associated with past executions of the respective step, comparing the error rate with the level of liability associated with the respective step, and determining the risk assurance value in accordance with the comparison of the error rate with the level of liability.

In accordance with some implementations, an electronic computing device includes one or more processors and memory storing one or more programs. The programs comprise instructions configured for execution by the one or more processor. The instructions cause the one or more processors to perform one or more of the processes described herein.

In accordance with some implementations, a non-transitory computer-readable storage medium stores instructions, which, when executed by an electronic device with one or more processors, cause the one or more processors to perform one or more of the processes described herein.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 10A-10E provide a flow diagram of an example method for processing tasks in accordance with some implementations.

Like reference numerals refer to corresponding parts throughout the drawings.

DESCRIPTION OF IMPLEMENTATIONS

Implementations described in this specification are able to build human-level knowledge by transforming data using a hybrid approach that includes machine learning and human contributions. The hybrid approach accounts for the risks involved in each component of a task and allocates machine learning processes and/or manual processing accordingly. In some implementations, the hybrid approach uses human contributions for oversight or completion of tasks deemed too risky to be completed only by machine learning processes. The implementations described herein automate the production of knowledge using a digital assembly line that allows human and machine processes to produce this knowledge programmatically. The hybrid approach uses an analytics process pipeline, which is a software solution that allows for humans and machines to work together and produce knowledge cooperatively, increasing the impact of even low-level machine models and allowing for the "operationalization" of automation. The implementations described herein allow users to define steps in a knowledge process, and quickly iterate and automate those steps, regardless of the complexity. The hybrid model approach means humans can leverage machines regardless of the complexity, and any remaining work that is not allocated for completion by a machine learning process can be passed along to humans.

In any business, there exist varying degrees of risk, complexity, and time involved with each step in a process. Current automation and machine learning technology providers often fail to consider processes that have extreme risk or complexity. Given that intelligent automation solutions are probabilistic, it is important to provide the ability to augment machine learning processes based on each unique node of a process. The implementations described herein enable a fully scalable human and machine assembly line, which in turn enables enterprises to optimize their workflows. Aspects of the implementations described (i) pinpoint key risks at process nodes and determine how much human/machine intervention is optimal for each unique situation, (ii) adapt workflow automation levels depending on human bandwidth, human skills, risk tolerance, and/or model development, and (iii) maximize efficiency based on a variety of parameters and real-time workflow analytics to constantly improve output.

Figure 1:
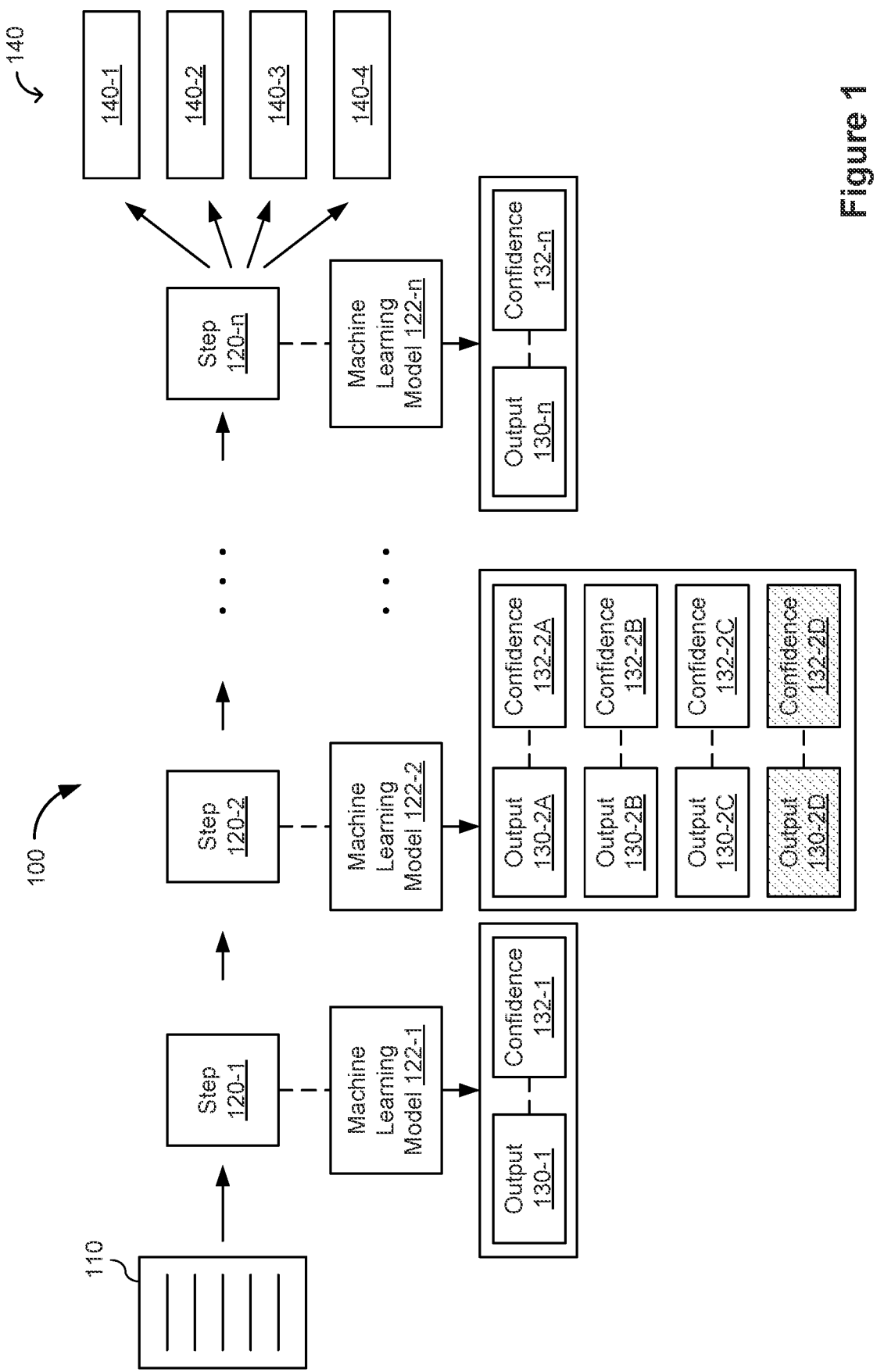
FIG. 1 is an example automation process in accordance with some implementations.

FIG. 1 is an example automation process 100 in accordance with some implementations. A processing system separates (e.g., divides) a task into steps 120 (e.g., sub-tasks, steps 120-1 through 120-n). A respective step 120 is associated with a respective machine learning model 122 that is trained to generate one or more outputs 130 for each step 120 (e.g., machine learning model 122-1 generates output 130-1 for step 120-1, and machine learning model 122-2 generates outputs 130-2A through 130-2D for step 120-2). The machine learning model 122 also generates a confidence value 132 (e.g., confidence score) for each generated output 130, and the confidence value 132 indicates an accuracy of the corresponding output 130 (e.g., a confidence value 132-1 indicates an estimated accuracy of the output 130-1). For a respective step 120, the processing system identifies which outputs 130 from the machine learning model 122 can be accepted as final outputs for the step 120 and which outputs 130 require additional user input (e.g., human input) based on a comparison between the confidence value 132 associated with the output 130 and a threshold confidence value (e.g., a predetermined threshold confidence value) associated with the step 120 (e.g., associated with the machine learning model 122 for the step 120). Thus, the entire task is streamlined via automation of steps by machine learning models 122 without compromising accuracy due to the delegation (e.g., allocation) of outputs to be determined (e.g., recalculated) or checked manually by a user (e.g., human) when confidence values 132 for outputs 130 do not meet a threshold confidence value for the step 120. Once all the steps of the task are completed, the processing system provides one or more results 140 (e.g., results 140-1 through 140-4) for the document 110.

For example, the task may be to analyze documents and discern important rules and regulations described in the document. The document may be, for example, a legal document, a safety procedure document, or a workplace code of conduct. The processing system receives a document 110 and performs each of the steps 120 of the task in order to generate results 140 that identify rules and regulations in the document 110. For example, in step 120-1, a machine learning model 122-1 associated with step 120-1 identifies a jurisdiction of the document (e.g., state of California), and in step 120-2, a machine learning model 122-2 associated with step 120-2 divides the documents into a plurality of chunks that each correspond to a different chapter in the document. In this example, the machine learning model 122-2 generates four outputs (e.g., outputs 130-2A through 130-2D, each of which is a chunk of the document 110) for step 120-2, and each of the four outputs is associated with a corresponding confidence value (e.g., output 130-2A is associated with confidence value 132-2A, and output 130-2B is associated with confidence value 132-2B). In this example, each of the confidence values 132-2A, 132-2B, and 132-2C meets a threshold confidence value corresponding to step 120-2 and thus, the outputs 130-2A, 130-2B, and 130-2C are accepted as final outputs for step 120-2. In contrast, the confidence value 132-2D does not meet the threshold confidence value corresponding to step 120-2 and thus, the output 130-2D is identified as requiring user input. The user input may include a user checking to make sure the output 130-2D is correct and/or the user performing at least a portion of the step 120-2 in order to provide a correct output as a final output for step 120-2. For instance, if step 120-2 is a step to divide a document into different chunks that each corresponds to a section of the document, then output 130-2A corresponds to a first section of the document, output 130-2B corresponds to a first section of the document, and so on. Outputs 130-2A through 130-2C may have high confidence values 132-2A through 132-2C, since they correspond to well-defined sections in the document 110, each of which starts on a new page of the document. However, the machine learning model 122-2 may have identified end notes as a separate fourth section of the document and generated output 130-2D corresponding to the end notes of the document 110. The confidence value 132-2D associated with output 130-2D may be low since the end notes do not start on a new page and have a different heading style relative to the other sections of the document 110. Thus, the confidence value 132-2D does not meet the threshold confidence value associated with the step 120-2, and user input is required. In one example, the user input is to remove output 130-2D entirely since it does not correctly correspond to a separate section in the document 110. In another example, the user input is to replace output 130-2D with a fifth portion of the document 110 that the machine learning model 122-2 failed to correctly identify.

In some implementations, the task is performed for a plurality of documents and a respective machine learning model 122 associated with a respective step 120 of the task can be updated in accordance with (e.g., based on) user input corresponding to outputs 130 from the machine learning model 122. For example, user input provided regarding output 130-2D is used to update (e.g., re-train or improve) the machine learning model 122-2 for future use. Because more information is collected as the steps 120 of the task are performed on more documents (e.g., different documents), the machine learning models 122 associated with steps 120 of the task continue to improve. For a respective step 120 and a respective machine learning model 122, the portion of outputs that correspond to a confidence value that exceeds the threshold confidence value for the respective step 120 increases over time, thereby increasing automation of the task and decreasing the need for manual processing. For example, for a first document, 25% of the outputs 130-2 for step 120-2 were identified as requiring user input. After updating the machine learning model 122-2 using user inputs provided with respect to outputs 130-2 from the machine learning model 122-2 as feedback, the machine learning model 122-2 is expected to perform better (e.g., provide outputs 130-2 with higher confidence values 132-2), and thus, the number of outputs 130-2 from the machine learning model 122-2 that require human input is expected to decrease as the machine learning model 122-2 is applied to more documents and is updated.

In some implementations, the threshold confidence value for a step 120 is determined based on (e.g., in accordance with) the amount of risk associated with the step 120. For example, a step 120 for identifying an editor of the document may have a lower amount of risk relative to a step associated with determining the year of the document since the consequences of incorrectly labeling identified rules (e.g., results 140) as being rules for the year 2020 instead of the year 2021 can be greater than the consequences of incorrectly identifying that "John Smith" compiled the document rather than "John Smithe."

Figure 2:
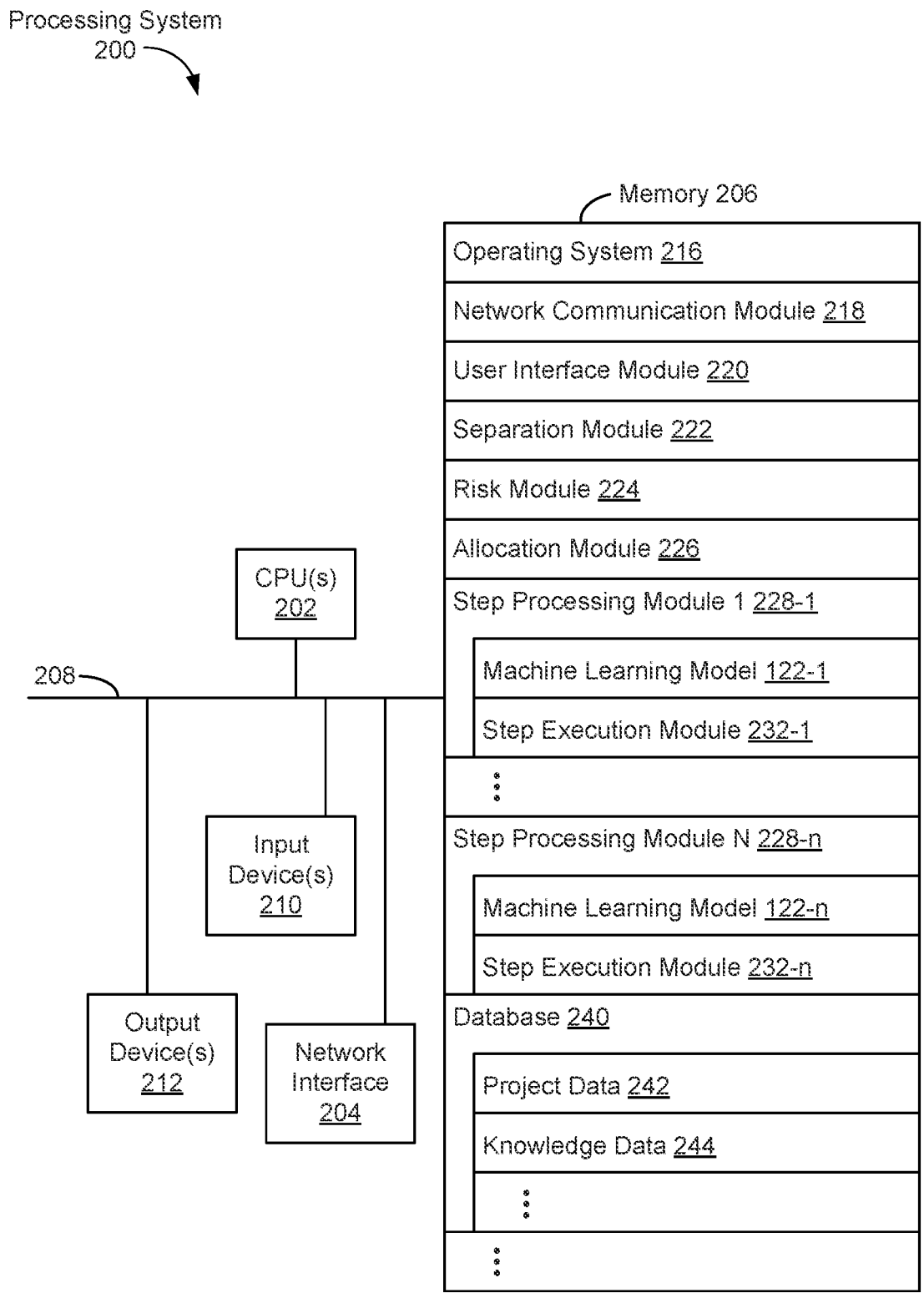
FIG. 2 is a block diagram illustrating an example processing system in accordance with some implementations.

FIG. 2 is a block diagram of an example processing system 200 in accordance with some implementations. Examples of the processing system 200 include a desktop computer, a laptop computer, a tablet computer, a server system, or many other electronic computing devices. The processing system 200 includes one or more processing units (CPUs) 202, one or more network interfaces 204, memory 206, and one or more communication buses 208 for interconnecting these components (sometimes called a chipset). The processing system 200 includes one or more input devices 210 for user input, such as a keyboard, a mouse, a voice-command input unit or microphone, a touch screen display, a touch-sensitive input pad, a gesture capturing camera, or other input buttons or controls. Furthermore, some processing systems 200 use a microphone and voice recognition, or a camera and gesture recognition to supplement or replace interfaces requiring physical contact (e.g., a keyboard and buttons). In some implementations, the processing system 200 includes one or more output devices 212, which enable presentation of user interfaces and display content, including one or more speakers and/or one or more visual displays.

In some implementations, the memory 206 includes high-speed random access memory, such as DRAM, SRAM, DDR RAM, or other random access solid state memory devices. In some implementations, the memory 206 includes non-volatile memory, such as one or more magnetic disk storage devices, one or more optical disk storage devices, one or more flash memory devices, or one or more other non-volatile solid state storage devices. In some implementations, the memory 206 includes one or more storage devices remotely located from one or more processing units 202. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:

- an operating system 216, which includes procedures for handling various basic system services and for performing hardware dependent tasks;
- a network communication module 218, which connects the processing system 200 to other devices via one or more network interfaces 204 (wired or wireless) and one or more networks, such as the Internet, other wide area networks, local area networks, metropolitan area networks, and so on;
- a user interface module 220, which presents information graphically (e.g., a graphical user interface for presenting applications, widgets, websites and web pages thereof, audio content, video content, and/or text) at the processing system 200 via one or more output devices 212 (e.g., displays and/or speakers);
- a separation module 222, which separates, splits, parses, and/or divides tasks into steps 120 (e.g., a plurality of steps 120, one or more steps 120);
- a risk module 224, which determines risk assurance levels associated with each step 120;
- an allocation module 226, which allocates operations associated with step 120 to automated processes (using machine learning) and manual processes (requiring user input) based on the risk assurance levels;
- a plurality of step processing modules 228-1, . . . , 228-n, which process steps 120. Each step processing module 228 includes:
  - one or more machine learning models 122, which perform or otherwise support the automated execution of operations associated with respective steps 120; and
  - one or more step execution modules 232, which execute operations associated with respective step 120 using combinations of automated and manual processes as allocated by the allocation module 226;
- a database 240, which stores:
  - project data 242, including results of step executions for respective tasks; and
  - knowledge data 244, including insights learned from the execution of projects or tasks. In some implementations, knowledge data 244 includes the results 140 of a task.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 206 stores a subset of the modules and data structures identified above. In some implementations, the memory 206 stores additional modules and data structures not described above.

Figure 3A:
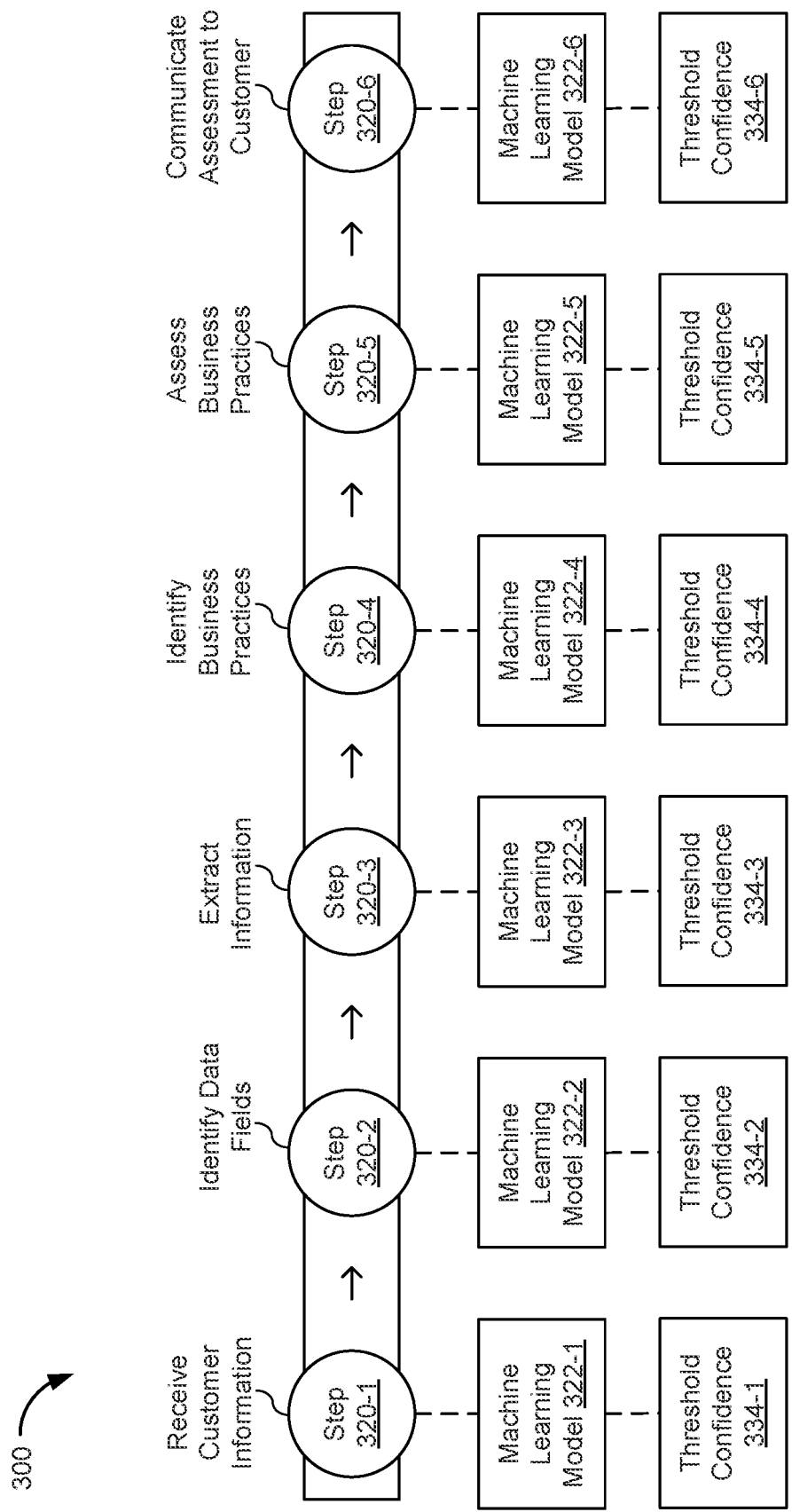
FIG. 3A provides an example task processing scenario in accordance with some implementations.

FIG. 3A provides an example task processing scenario 300 in accordance with some implementations. The example scenario 300 includes a process used by an example business for risk assessment services to customers (e.g., clients) of the business. The processing system 200 (e.g., the separation module 222) divides the task into steps 320 (e.g., steps 320-1 through 320-6). In some implementations, the separation module 222 uses machine learning to processes the task into steps 320. Additionally or alternatively, a user manually separates the task into the discrete steps 320. The processing system 200 also identifies a trained machine learning model 322 for generating outputs for each step 320 of the task, and determines a respective threshold confidence value for the respective step 320. For a respective step 320, the respective trained machine learning model 322 generates outputs and confidence values corresponding to the outputs. The confidence value for each output generated by the respective trained machine learning model 322 is compared to the respective threshold confidence value for the respective step 320, and the comparison is used to determine whether or not user input is required for each output generated by the respective trained machine learning model 322.

In the example shown in FIG. 3, the task is processed into six steps:
- step 320-1 for confirming receipt of the customer information (e.g., complete customer information);
- step 320-2 for identifying data fields in the customer information (e.g., separating content of a customer information document into chunks);
- step 320-3 for extracting the information from the identified data fields (e.g., extracting information from the chunks);
- step 320-4 for identifying business practices based on the extracted information;
- step 320-5 for generating a risk assessment of the identified business practices; and step 320-6 for communicating the risk assessment to the customer (e.g., generating a deliverable output such as a report, an email, or a letter to the customer).

While completion of each of the steps 320 is required for completion of the task, each of the steps 320 may be associated with a different level of importance or liability relative to other steps 320 in the task. For example, correctly identifying business practices for the task may require a high level of accuracy (e.g., a low margin of acceptable error) since the failing to identify the correct business methods utilized by the customer will also lead to an inaccurate risk assessment for the client. In contrast, a higher margin of error may be acceptable for identifying data fields in the customer information in step 320-2 relative to identifying business practices in step 320-4. Thus, the threshold confidence value 334-4 corresponding to step 320-4 may be higher (e.g., a higher value) relative to the threshold confidence value 334-2 corresponding to step 320-2. For example, step 320-4 requires that confidence scores associated with outputs generated by machine learning model 322-4 be equal to or greater than a threshold confidence value 334-4 of 95% to be accepted as final outputs without requiring user input (e.g., any outputs generated by machine learning model 322-4 that are associated with a confidence value that is less than the threshold confidence value 334-4 of 95% will require manual processing). In contrast, step 320-2 may require that confidence scores associated with outputs generated by machine learning model 322-2 be equal to or greater than a threshold confidence value 334-2 of 80% to be accepted as final outputs without requiring user input (e.g., any outputs generated by machine learning model 322-2 that are associated with a confidence value 332-2 that does not meet the threshold confidence value 334-2 of 80% will require manual processing).

Each of the threshold confidence values 334 (e.g., threshold confidence values 334-1 through 334-6) are independent from one another and determined independently from one another. For example, the threshold confidence value 334-1 is determined (e.g., independently determined) based on a risk assurance analysis for step 320-1, and the threshold confidence value 334-2 is determined (e.g., independently determined) based on a risk assurance analysis for step 320-2. In some implementations, in order to determine (e.g., set) a respective threshold confidence value 334 for a respective step 320, the processing system 200 identifies (e.g., determines or receives) a risk assurance value for (e.g., associated with) the respective step 320. In some implementations, the processing system 200 determines the level of liability associated with the respective step 320 and determines the risk assurance value for the respective step 320 based on the determined level of liability for the respective step 320. In some implementations, the processing system 200 identifies one or more government regulations related to the respective step, and identifies one or more consequences of not complying with the one or more government regulations. The processing system 200 determines the level of liability for respective step 120 based at least in part on the one or more consequences of not complying with the one or more government regulations. In some implementations, the processing system 200 determines an error rate associated with past executions of the respective step, compares the error rate with the level of liability for the respective step 320, and determines the risk assurance value for the respective step in accordance with the comparison of the error rate with the level of liability.

FIG. 3B-3G provide examples of executing the task shown in FIG. 3A in accordance with some implementations. The examples provided in FIGS. 3B-3G follow the example of steps 320 as described above with respect to FIG. 3A.

Figure 3B:
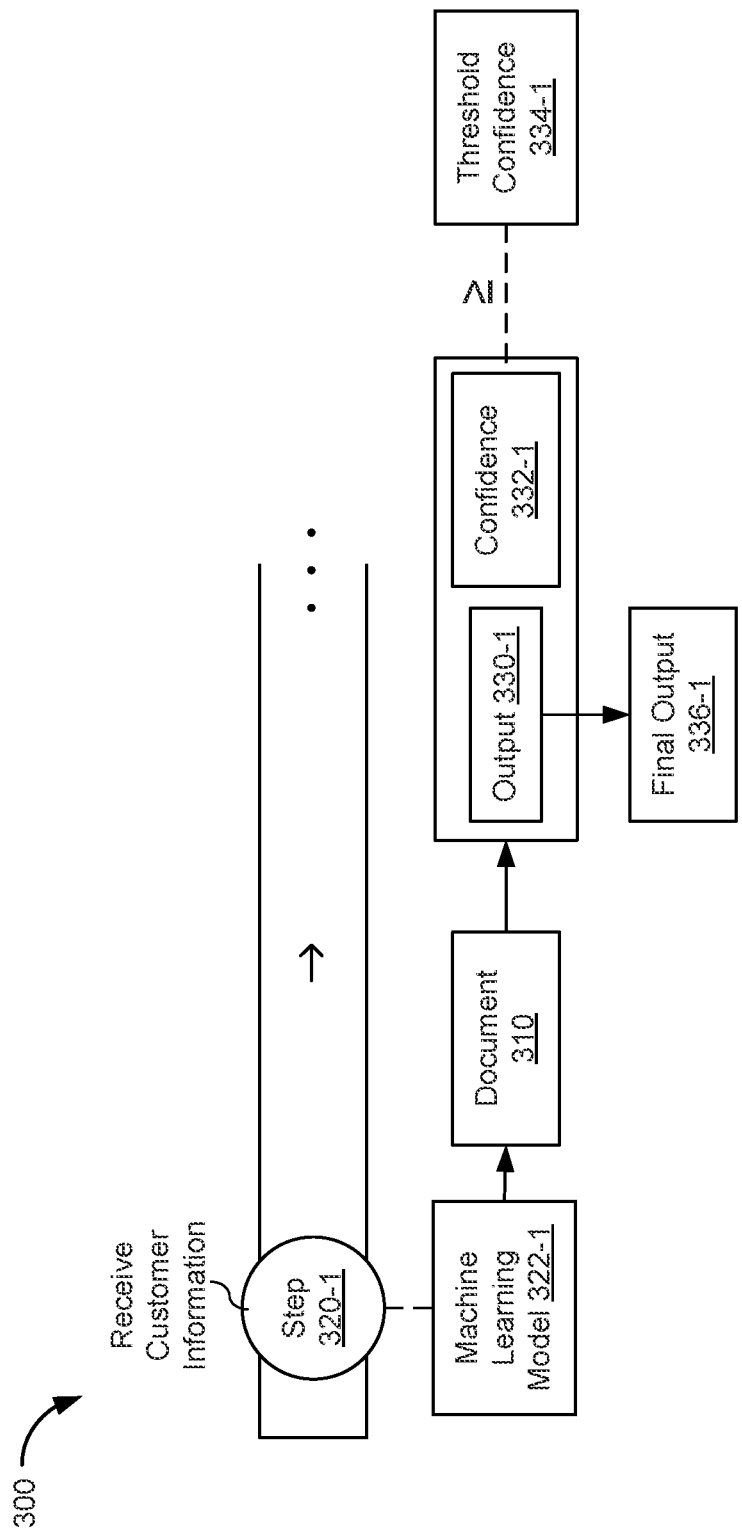
FIG. 3B-3G provide examples of executing the task shown in FIG. 3A in accordance with some implementations.

Referring to FIG. 3B, step 320-1 is a step for confirming receipt of customer information. For example, the customer information is a form that is electronically filled and submitted or a form that is filled out by hand and scanned into an electronic format. In some cases, receiving the customer information includes receiving one or more documents regarding the customer such as receiving emails with attachments or receiving documents that are uploaded to a server system or a database. The machine learning model 322-1 is applied to the document 310 and provides an output 330-1 that indicates whether or not the document includes complete information. The machine learning model 322-1 is also trained to provide a confidence value 332-1, which indicates confidence in the accuracy of (e.g., an estimate in the accuracy of) the generated output 330-1. For example, if the machine learning model 322-1 provides an output 330-1 that indicates that completed information has been received, but is not very confident in its determination (for instance, if one of the entry fields has crossed out information or bad hand writing and the machine learning model 322-1 is not able to confirm that the entry field has legible text), the machine learning model 322-1 may provide a low confidence value 332-1 (e.g., 43%). In contrast, if the machine learning model 322-1 is confident in its determination that complete information has been received, the machine learning model 322-1 provides a high confidence value 332-1 (e.g., 94%). The confidence value 332-1 generated by the machine learning model 322-1 is compared to a threshold confidence value 334-1 corresponding to the step 320-1 (e.g., corresponding to the machine learning model 322-1 associated with the step 320-1). In this example, the confidence value 332-1 meets (e.g., meets or exceeds) the threshold confidence value 334-1, and thus, the output 330-1 generated by the machine learning model 322-1 is accepted (e.g., without requiring user input or user review) as the final output 336-1 for the step 320-1.

Figure 3C:
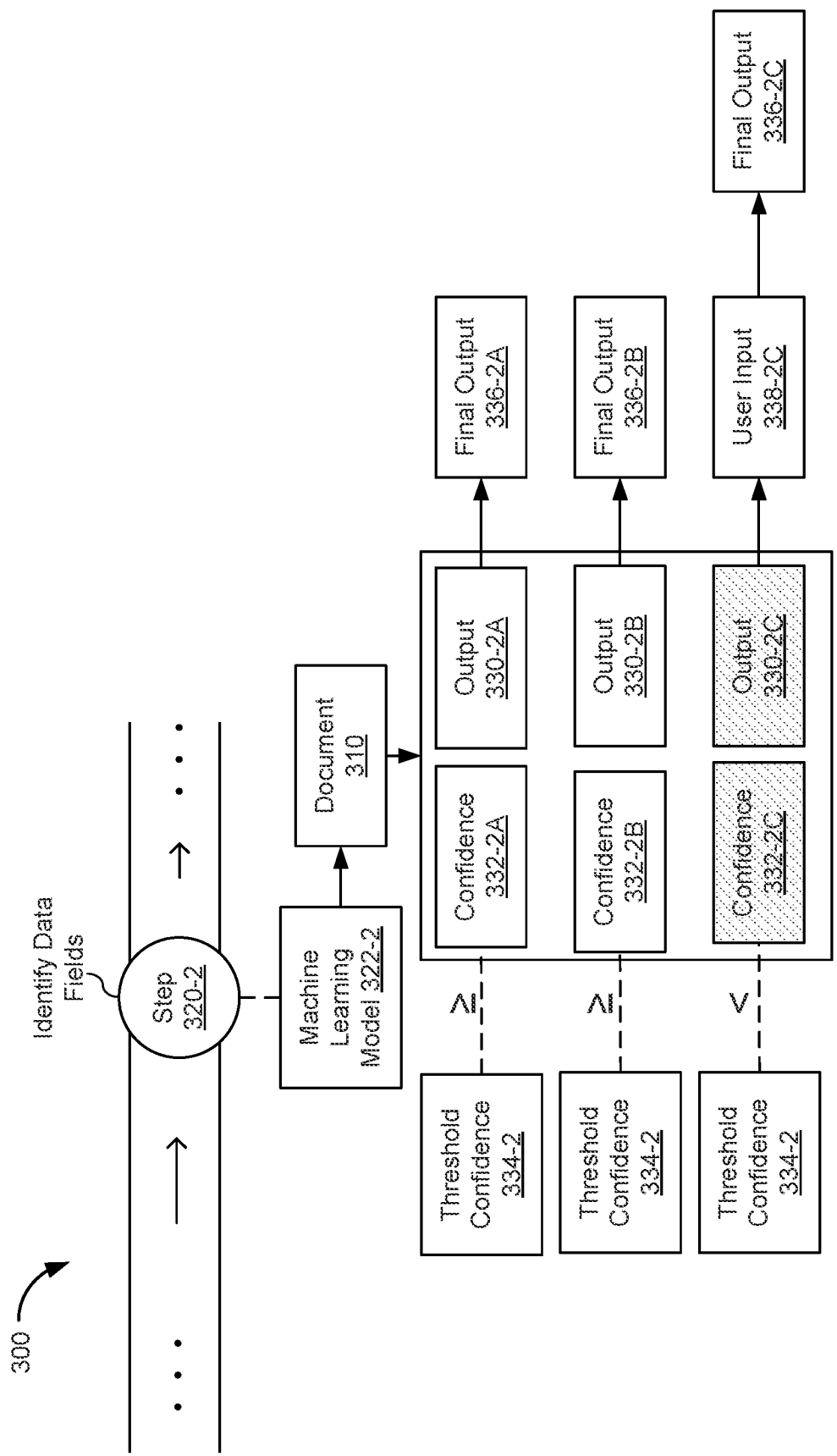

Referring to FIG. 3C, step 320-2 is a step that identifies data fields in the customer information form (e.g., separates the customer information form into chunks where each chunk corresponds to a distinct data field). The machine learning model 322-2 is applied to the document 310, and identifies data fields in the customer information form to generate a plurality of outputs 330-2 (e.g., outputs 330-2A through 33-2C) that each corresponds to a distinct data field in the customer information form (e.g., each output 330-2 is a chunk associated with a data field). The machine learning model 322-2 also provides a plurality of confidence values 332-2 (e.g., confidence values 332-2A through 332-2C) that each corresponds to a specific output of the plurality of outputs 330-2. Each of the confidence values 332-2 indicates the confidence in the accuracy of (e.g., an estimate in the accuracy of) a corresponding output 330-2. For example, the first confidence value 332-2A provides an indication of a confidence in the accuracy of the corresponding output 330-2A, and the second confidence value 332-2B provides an indication of a confidence in the accuracy of the corresponding output 332-2B. Each of the confidence values 332-2 (e.g., confidence values 332-2A through 332-2C) is compared to the threshold confidence value 334-2 corresponding to the step 320-2 (e.g., corresponding to the machine learning model 322-2 associated with the step 320-2). In this example, each of the confidence values 332-2A and 332-2B meets (e.g., meets or exceeds) the threshold confidence value 334-2, and thus, the outputs 330-2A and 330-2B generated by the machine learning model 322-1 are both accepted and stored (e.g., without requiring user input or user review) as final outputs 336-2A and 336-2B, respectively, for the step 320-1. In contrast, the confidence value 332-2C does not meet the threshold confidence value 334-2, and thus, the output 330-2C requires user input 338-2C. User input 338-2C may include any of a user review, user confirmation that the output 330-2C is correct (e.g., accurate), or a user edit to correct the automated output 330-2C (in the case that output 330-2C is incorrect). In some cases, in order to provide the user input, the user must manually perform the step the machine learning model 322-2 was trained to do. For example, the user may have to look at the information document received regarding the customer and identify a third data field to confirm that the output 330-2C is correct (or incorrect). Once the user has manually executed this portion of step 320-2, the user's input 338-2C is accepted and stored as a final output 336-2C for step 320-2.

Figure 3D:
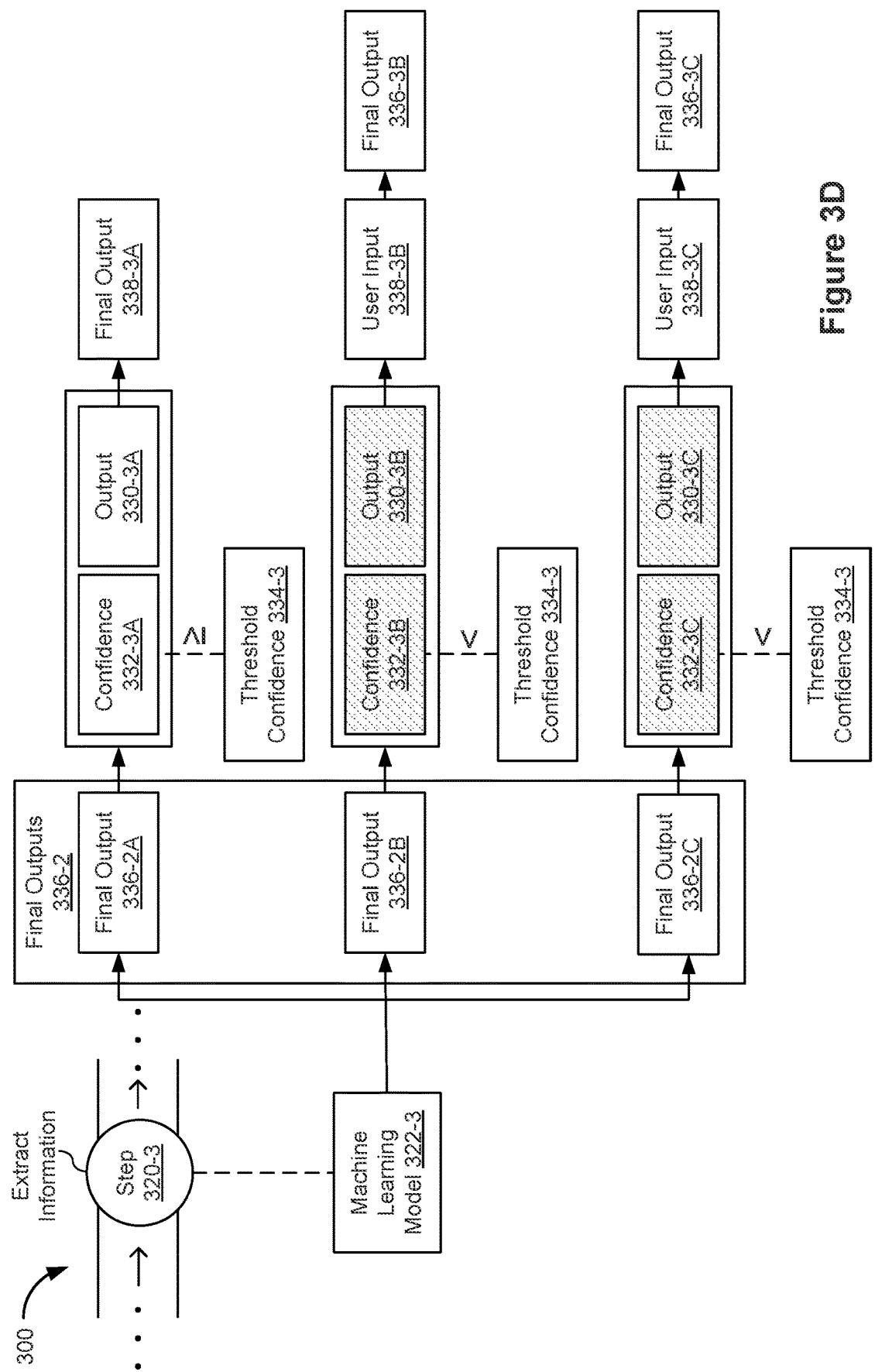

Referring to FIG. 3D, step 320-3 is a step that extracts information from the data fields identified in the previous step 320-2. Thus, the final outputs 336-2 (e.g., outputs 336-2A through 336-2C) for step 320-2 are provided to the step 320-3 as inputs, and the machine learning model 322-3 is applied to each of the final outputs 336-2 (e.g., outputs 336-2A through 336-2C) for step 320-2. The machine learning model 322-3 provides a plurality of outputs 330-3 (e.g., outputs 336-3A through 336-3C) that each includes information extracted from a respective data field previously identified in step 320-2. The machine learning model 322-3 also provides a plurality of confidence values 332-3 (e.g., confidence values 332-3A through 332-3C) that each corresponds to a specific output of the plurality of outputs 330-3. Each of the confidence values 332-3 indicates a confidence in the accuracy of (e.g., an estimate in the accuracy of) a corresponding output 330-3. For example, the machine learning model 322-3 is applied to the final output 336-2A to generate an output 330-3A and a confidence value 332-3A associated with the output 330-3A, and the machine learning model 322-3 is applied to the final output 336-2B to generate an output 330-3B and a confidence value 332-3B associated with the output 330-3B.

Each of the confidence values 332-3 (e.g., confidence values 332-3A through 332-3C) is compared to the threshold confidence value 334-3 corresponding to the step 320-3 (e.g., corresponding to the machine learning model 322-3 associated with the step 320-3). In this example, the first confidence value 332-3A meets (e.g., meets or exceeds) the threshold confidence value 334-32, and thus, the output 330-3A is accepted and stored (e.g., without requiring user input or user review) as a final output 336-3A for the step 320-1. In contrast, the confidence values 332-3B and 332-3C do not meet the threshold confidence value 334-3, and thus the outputs 330-3B and 330-3C require user input 338-3B and 338-3C. Once each the user inputs 338-3B and 338-3C are received, the user inputs 338-3B and 338-3C are accepted and stored as final outputs 336-3B and 336-3C, respectively, for step 320-3.

In this example, one piece of information is extracted for each final output 336-2 for the step 320-2 and thus, the machine learning model 322-3 generates three outputs 330-3A, 330-3B, and 330-3C for step 320-3, one output corresponding to each input (e.g., each of the final outputs 336-2 for the step 320-2). In practice, multiple pieces of information may be extracted from a single data field, in which case, the machine learning model 322-3 would provide more than three outputs 330-3 and the step 320-3 would include more than three final outputs 336-3. For example, since step 320-2 includes three final outputs 336-2 (e.g., final outputs 336-2A through 336-2C), three data fields were identified in step 320-3. Additionally, each of the three final outputs 336-3 (e.g., final outputs 336-3A through 336-3C) for the step 320-3 corresponds to information extracted for a respective data field corresponding to one of the outputs 336-2 from step 320-2. For example, the final output 336-2A for the step 320-2 corresponds to a first data entry field, and the final output 336-3A for the step 320-3 includes text or information that was input into the first data entry field.

Figure 3E:
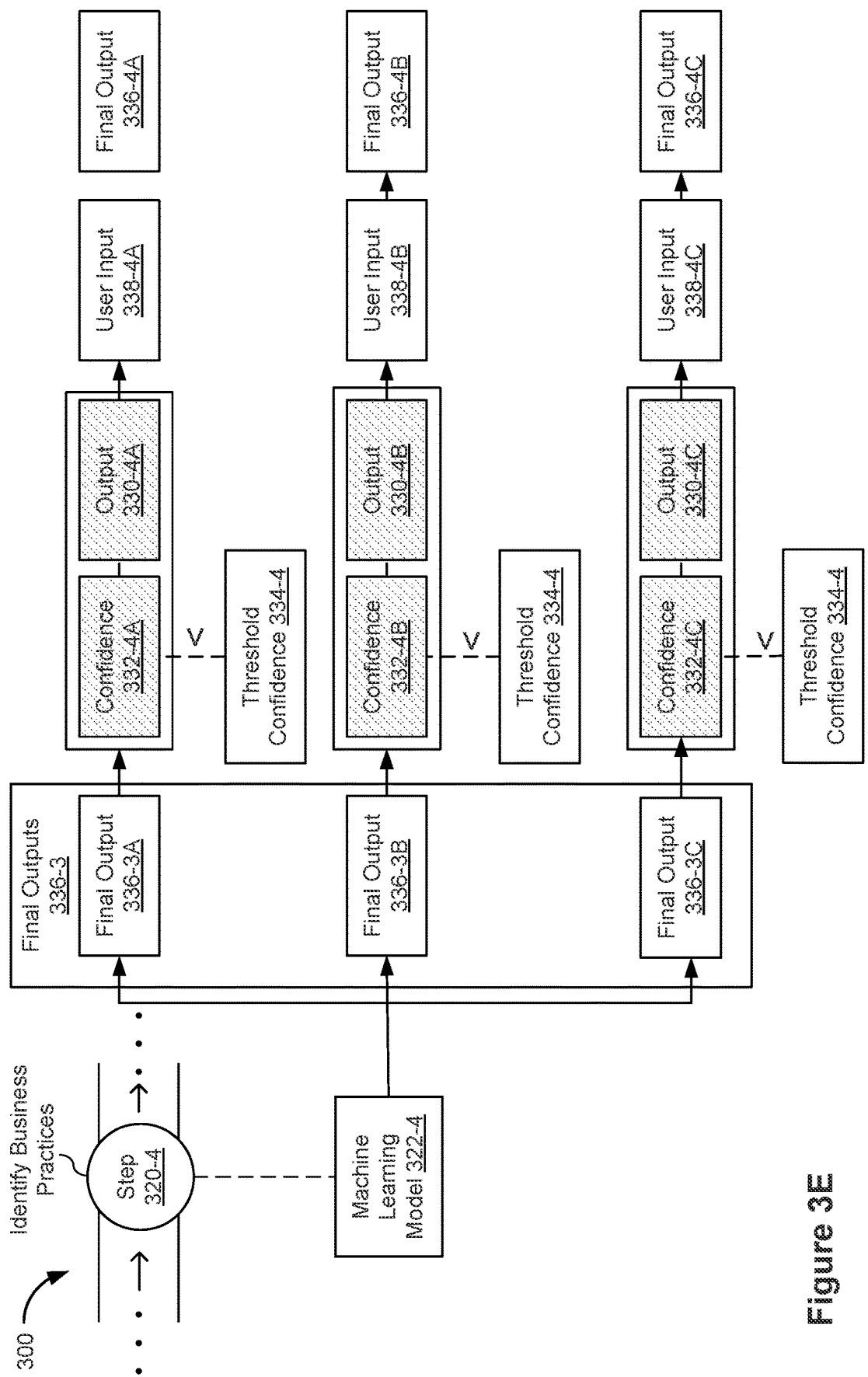

Referring to FIG. 3E, step 320-4 is a step that identifies business practices from the data fields identified in the previous step 320-3. Thus, the final outputs 336-3 (e.g., outputs 336-3A through 336-3C) for step 320-3 are provided to the step 320-4 as inputs, and the machine learning model 322-4 is applied to each of the final outputs 336-3 (e.g., outputs 336-3A through 336-3C) for step 320-3. The machine learning model 322-4 has been trained to provide a plurality of outputs 330-4 (e.g., outputs 336-4A through 336-4C) that each identifies a business practice based on the information previously identified in step 320-3. The machine learning model 322-4 also provides a plurality of confidence values 332-4 (e.g., confidence values 332-4A through 332-4C) that each corresponds to a specific output of the plurality of outputs 330-4. Each of the confidence values 332-4 indicates a confidence in the accuracy of (e.g., an estimate in the accuracy of) a corresponding output 330-4.

Each of the confidence values 332-4 (e.g., confidence values 332-4A through 332-4C) is compared to the threshold confidence value 334-4 corresponding to the step 320-4 (e.g., corresponding to the machine learning model 322-4 associated with the step 320-4). In this example, each the confidence values 332-4A, 332-4B, and 332-4C fails to meet the threshold confidence value 334-4, and thus, each of the outputs 330-4A, 330-4B and 330-4C requires user input 338-4A, 338-4B and 338-4C, respectively. Once each the user inputs 338-4A, 338-4B, and 338-4C, is received, the user inputs 338-4A, 338-4B, and 338-4C, is accepted and stored as final outputs 336-4A, 336-4B and 336-3C, respectively, for step 320-4.

Figure 3F:
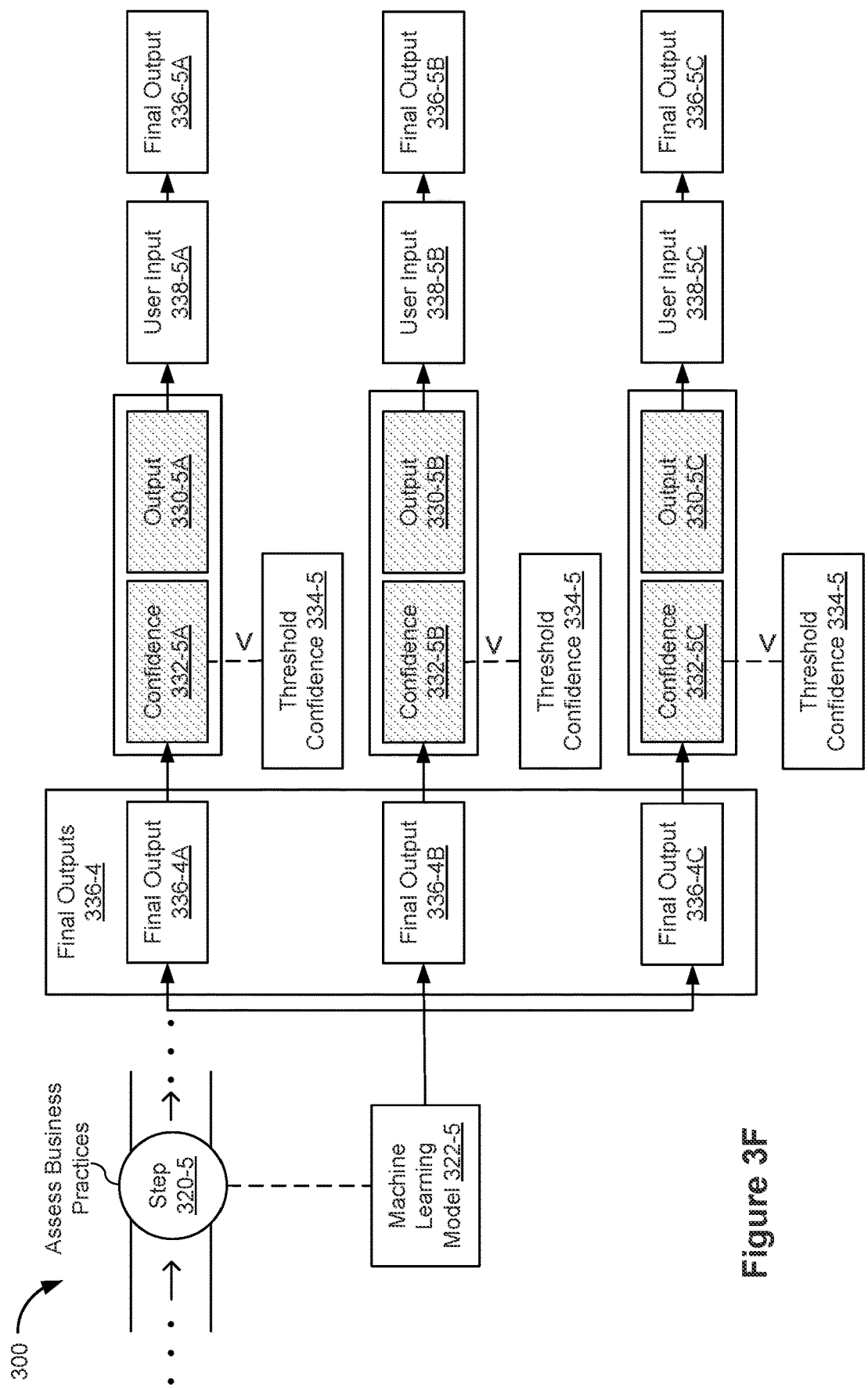

Referring to FIG. 3F, step 320-5 is a step that assesses the business practices as identified in the previous step 320-4. Thus, the final outputs 336-4 (e.g., outputs 336-4A through 336-4C) for step 320-4 are provided to the step 320-5 as inputs, and the machine learning model 322-5 is applied to each of the final outputs 336-4 for step 320-4. The machine learning model 322-5 has been trained to generate a plurality of outputs 330-5 (e.g., outputs 336-5A through 336-5C) that each provides an assessment based on the business practice previously identified in step 320-4. The machine learning model 322-5 also provides a plurality of confidence values 332-5 (e.g., confidence values 332-5A through 332-5C) that each corresponds to a specific output of the plurality of outputs 330-5. Each of the confidence values 332-5 indicates a confidence in the accuracy of (e.g., an estimate in the accuracy of) a corresponding output 330-5.

Each of the confidence values 332-5 is compared to a threshold confidence value 334-5 corresponding to the step 320-5 (e.g., corresponding to the machine learning model 322-5 associated with the step 320-5). In this example, each of the confidence values 332-5A, 332-5B, and 332-5C fail to meet the threshold confidence value 334-5, and thus, each of the outputs 330-5A, 330-5B, and 330-5C requires user input 338-5A, 338-5B, and 338-5C, respectively. Once each of the user inputs 338-5A, 338-5B, and 338-5C, is received, the user inputs 338-5A, 338-5B, and 338-5C, are accepted and stored as final outputs 336-5A, 336-5B, and 336-3C, respectively, for step 320-5.

Figure 3G:
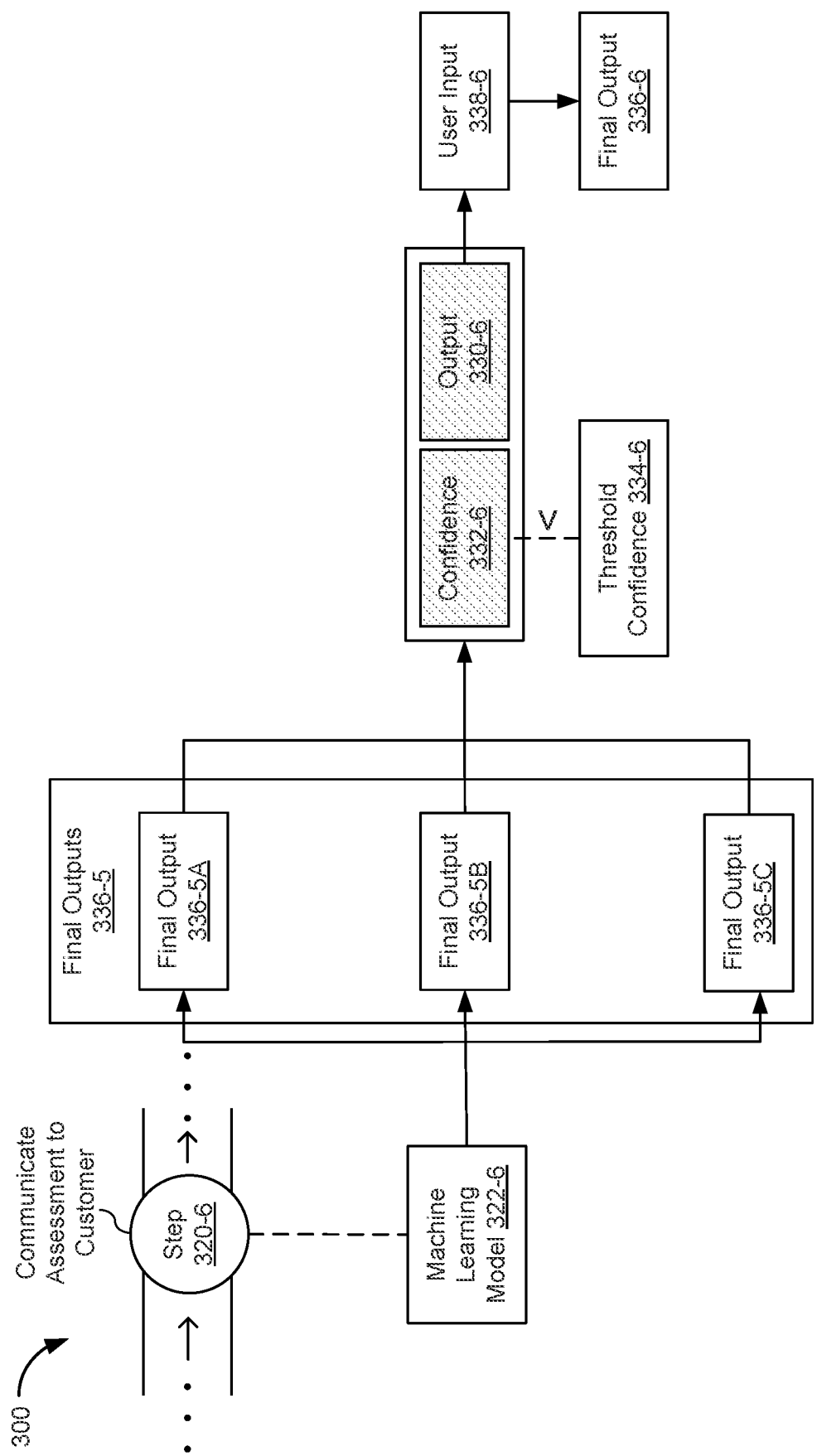

Referring to FIG. 3G, step 320-6 is a step that communicates the assessment (as determined in the previous step 320-5) to the customer. Thus, the final outputs 336-5 (e.g., outputs 336-5A through 336-5C) for step 320-5 are provided to the step 320-6 as inputs, and the machine learning model 322-6 is applied to each of the final outputs 336-5 for step 320-5. The machine learning model 322-6 is trained to generate an outputs 330-6 that is a communication document (such as a letter, email, or report) that provides the business practice assessments previously identified in step 320-5. For example, the machine learning model 322-6 may be trained to use contact information extracted from data fields of the document 310 (e.g., information obtained from outputs 330-3 of step 320-3) in order to fill in a mailing address or email address and to generate a greeting (e.g., Dear "Jane Doe"). The machine learning model 322-6 may also be trained to compile a body for the email or letter, which includes results of the business assessment (e.g., outputs 330-5 of step 320-5) analysis performed in step 320-5. In this example, the machine learning model 322-6 generates an output 330-6 that is a business practice assessment report for the customer, and a confidence values 332-6 that indicates a confidence in the accuracy of (e.g., an estimate in the accuracy of) the report (e.g., output 330-6). Relative to some of the other steps 320 of the task, such as step 320-2 to identify data fields in a form, step 360-6 is more complex and has a high risk assurance value, since the output from step 320-6 is the final work product that is delivered directly to the customer. Thus, the threshold confidence value 334-6 associated with step 320-6 may be high (e.g., 99%). In some implementations, the risk assurance value associated with this step 320-6 may be so high that the task is always allocated for manual processing by a human or for review by a human. In this example, the confidence value 332-6 associated with the output 330-6 (e.g., report) generated by the machine learning model 322-6 does not meet the threshold confidence value 334-6. Thus, the processing system 200 provides an indication that the task needs to be process manually, and that user input 338-6 is required. Once the user input 338-6 is received, the user input 338-6 is stored as the final output 336-6 (e.g., final work product). In this example, the final output 336-6 for step 320-6 is also the final result (e.g., final report) for the task.

In some implementations, the steps 320 are executed sequentially. In some implementations, at least two or more of the steps are executed simultaneously. For example, steps 320-1 and 320-2 are executed at a same time and step 320-3 is executed after at least one of steps 320-1 and 320-2 is completed.

Figure 4:
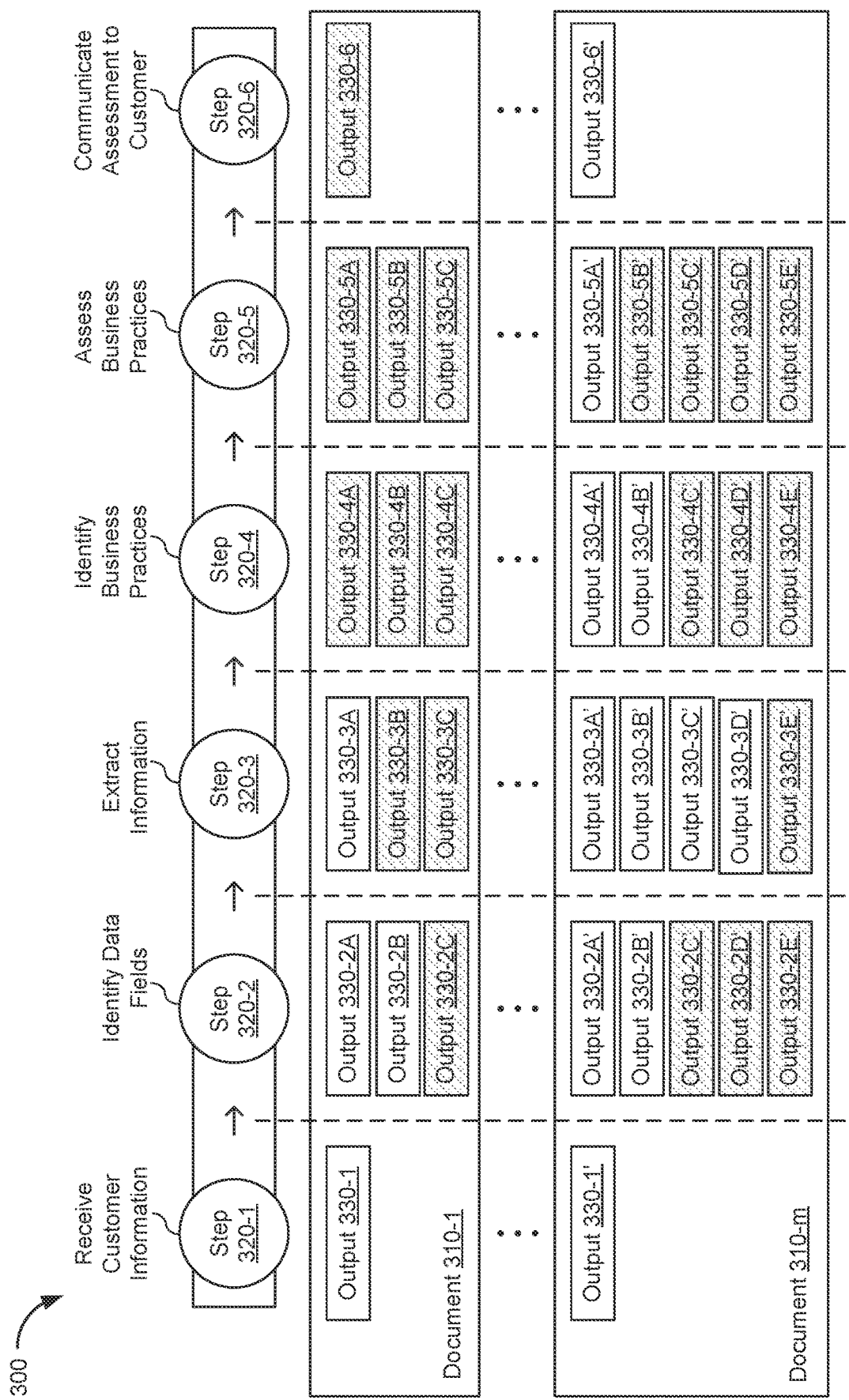
FIG. 4 illustrates multiple executions of the task shown in FIG. 3A in accordance with some implementations.

FIG. 4 illustrates multiple executions of the task shown in FIG. 3A in accordance with some implementations. The steps 320 described above with respect to FIGS. 3A-3G are executed for a plurality of documents 310 (e.g., documents 310-1 through 310-m). With each additional execution of the steps 320 (e.g., execution of the task), the processing system 200 can store user inputs 338 provided regarding outputs 330 from the machine learning models 322. Each of the machine learning models 322 associated with the steps 320 can be updated (e.g., retrained) using the user inputs 338. For example, after a predetermined number of executions (e.g., after every 1,000th document that is processed), the machine learning model 322-2 that is associated with step 320-2 is updated using the user inputs 338-2 corresponding to the outputs 330-2 generated by the machine learning model 322-2 as training data. In another example, after a predetermined period of time (e.g., every six months), the machine learning model 322-3 that is associated with step 320-3 is updated using the user inputs 338-3 corresponding to the outputs 330-3 generated by the machine learning model 322-3 as training data. Thus, as the steps 320 of the task are performed on more documents, the machine learning models 322 associated with the steps 320 are improved (e.g., the accuracy increases), thereby increasing the portion of the task that is automated.

In the example shown in FIG. 4, document 310-1 is processed at a first time and document 310-m is processed at a second time that follows the first time. Additionally, processing of the document 310-m includes using machine learning models 322 that have been updated relative to the machine learning models 322 used in processing the document 310-1. The outputs 330 from the machine learning models 322 at each step 320 of the task are shown. The outputs 330 that require user input are shown with a pattern fill and the outputs 330 that are stored as final outputs 336 for the step without requiring user input are shown without a pattern fill.

For step 320-3, the proportion (e.g., portion, percentage) of outputs 330-3' that require user input when processing document 310-1 is higher relative to the proportion (e.g., portion, percentage) of outputs 330-3 that require user input when processing document 310-m. Since the machine learning model 322-3 associated with the step 320-3 is updated when applied to the document 310-m, thereby having a better performance (e.g., higher accuracy) relative to the machine learning model 322-3 (e.g., the not updated machine learning model 322-3) used when processing the document 310-1, the number of outputs 330-3' from the updated machine learning model 322-3 that have a confidence value that meets (or exceeds) the threshold confidence value for the step 320-3 is increased, thereby requiring less user input. The same trends can be observed for steps 320-4 and 320-5.

In addition to updating the machine learning models 322 based at least in part on the user input, the threshold confidence values 334 associated with each of the steps 320 can also be updated. The threshold confidence values 334 are updated independently of one another (e.g., the threshold confidence value 334-1 associated with the step 320-1 may be updated without updating the threshold confidence value 334-2 associated with the step 320-2, or vice versa). In some implementations, user input is provided as feedback to update the respective threshold confidence value. In some implementations, a respective threshold confidence value 334 for a respective step 320 (e.g., for a respective machine learning model 322 associated with the respective step 320) is automatically updated (e.g., changed) based on (e.g., based at least in part on) the user inputs corresponding to the respective step 320. For example, in response to a determination that all outputs 330 from the respective machine learning model 322 meet the respective threshold confidence value 334, the respective threshold confidence value 334 may be raised in order to provide even higher accuracy (or better quality control). Alternatively or additionally, the respective threshold confidence value 334 may be updated (e.g., changed) manually (e.g., by a user). For example, the threshold confidence value 334-2 associated with step 320-2 when document 310-1 is processed may be 80% and the threshold confidence value 334-2 associated with step 320-2 when document 310-m is processed may be 88%.

In some implementations, each of the documents 310 (e.g., documents 310-1 through 310-m) differ from one another. For example, document 310-1 includes three data fields, whereas document 310-m includes five data fields.

Figure 5:
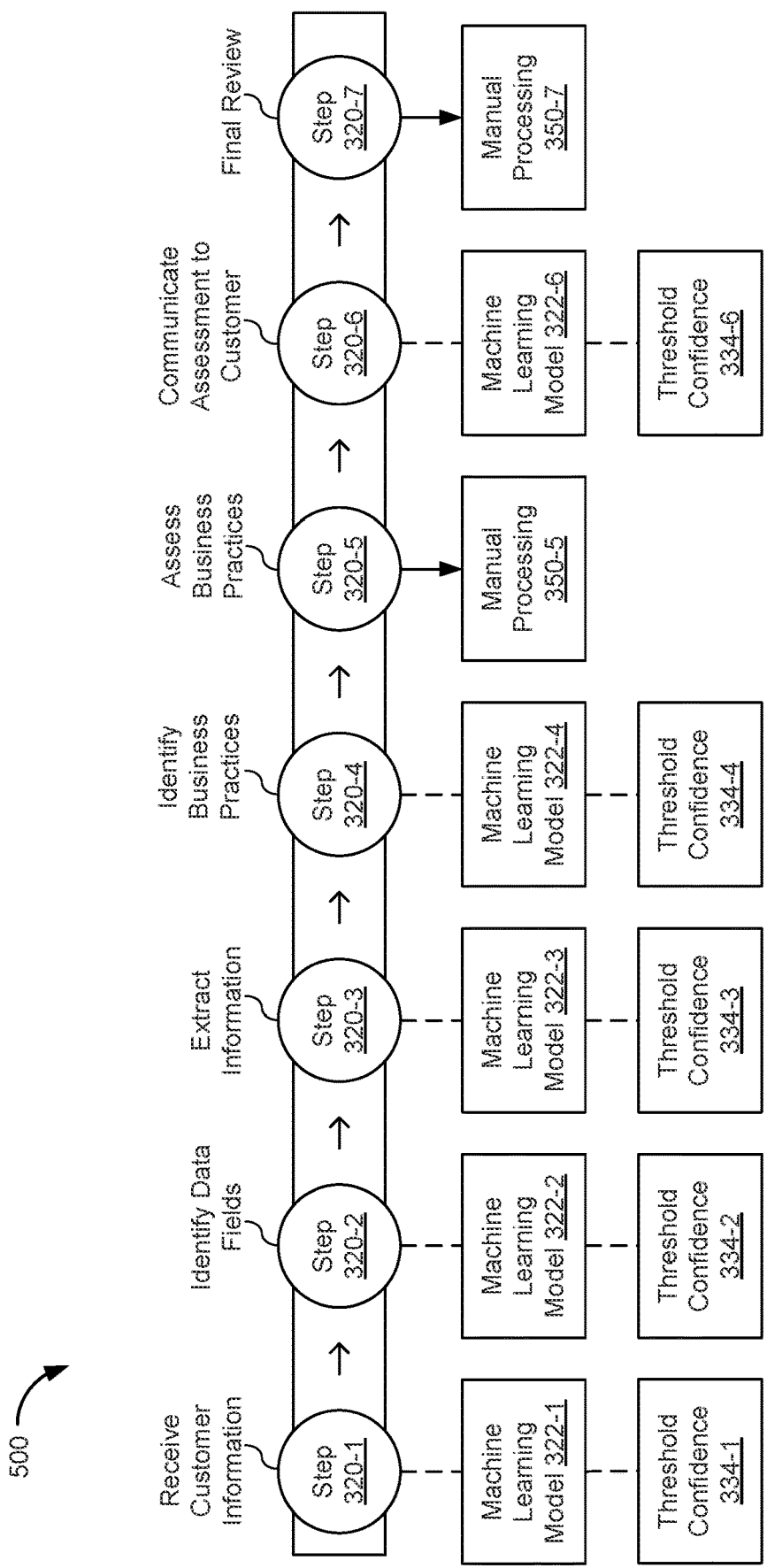
FIG. 5 provides an example of a task processing scenario in accordance with some implementations.

FIG. 5 provides an example of a task processing scenario 500 in accordance with some implementations. The task processing scenario 500 is similar to the task processing scenario 300 shown in FIG. 3A. In contrast to the task processing scenario 300 shown in FIG. 3A, the task processing scenario 500 includes one or more additional steps that require (e.g., demand) manual processing.

In the task processing scenario 500, the step 320-5 of the task is designated as a manual processing step 350-5. In such cases, the step 320-5 is not associated with a machine learning model and is always designated to be executed by a human. The step 320-5 may be allocated as a manual processing step 350-5 for any reason. For example, the step 320-5 may involve complex analysis for which no good machine learning model currently exists. In another example, the step 320-5 may be associated with an extremely high risk assurance value such that execution of this step cannot be trusted to be performed without human supervision or cannot be trusted to be performed by a machine learning model.

The task processing scenario 500 also includes step 320-7 that is a review step. The step 320-7 is designated for manual processing 350-7 such that any work product is reviewed and finalized by a human prior to being published or sent to a client. In this example, the review step 320-7 requires that a user review the final output 336 for step 320-6 before finalizing results for the task associated with the steps 320. In some implementations, a manual review step (such as step 320-7) may require a user review output from another step (any of steps 320-1 through 320-6) that is executed prior to executing the manual review step 320-7. In this example, the review step 320-7 immediately follows step 320-6. However, the review step 320-7 may be a step for manual review of outputs 330-5 for step 320-5, which does not immediately precede review step 320-7.

Figure 6:
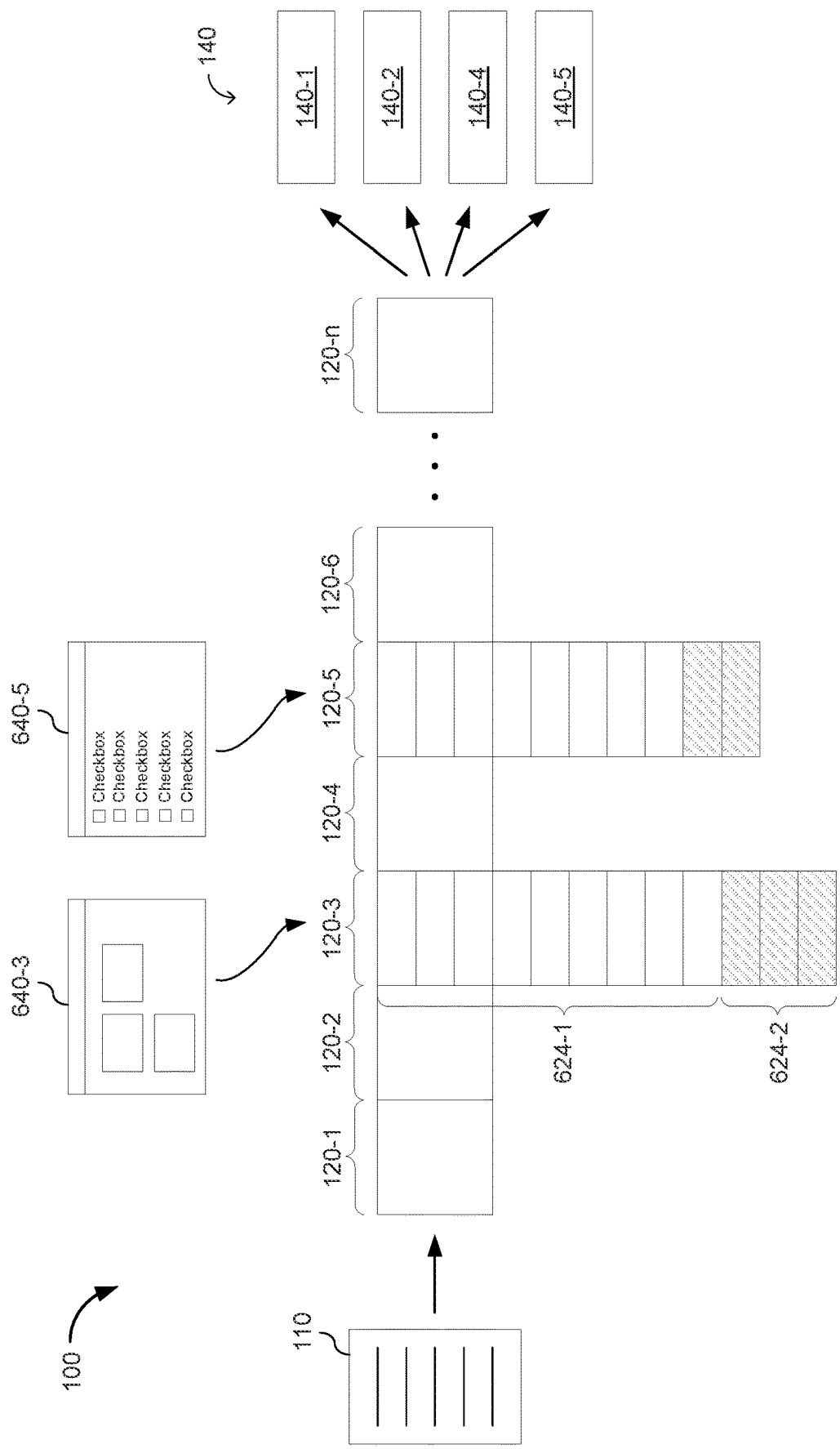
FIG. 6 is an example automation process in accordance with some implementations.

FIG. 6 is an example automation process 100 (shown in FIG. 1) in accordance with some implementations. In some implementations, the processing system 200 obtains user input (e.g., which is required for manual processes) by generating one or more requests. In some implementations, the requests are rendered in a user interface (UI), such as the UI 640-3 for the step 120-3 and the UI 640-5 for the step 120-5. The UIs include various elements facilitating user input. One example UI element is a message (shown in 640-3) asking for user input, or asking a user to complete an operation that was not allocated to an automated process. Another example UI element is a checklist (shown in 640-5) asking for a user to provide oversight in the form of approvals or disapprovals for results of automated processes associated with certain levels of risk.

FIG. 6 also illustrates a portion of the execution of each step to (i) one or more machine learning processes (referred to herein as "automated processes) and/or (ii) one or more processes requiring user input (referred to herein as "manual processes"). In general, the higher the risk involved with the execution of a given step, the greater the portion assigned to manual processes. A first portion (e.g., a subset, less than all) 624-1 of step 120-3 are assigned to one or more automated processes (e.g., assigned to be completed by a machine learning model such that output from the machine learning model is accepted as final output for the step), and a second portion (e.g., a subset, less than all) 624-2 of step 120-3 are assigned to one or more manual processes (e.g., requiring user review or edit of output generated by a machine learning model). The second portion 624-2 of step 120-3 is distinct from (e.g., different from and non-overlapping with) the first portion 624-1 of step 120-3. In this example, $3/12=25\%$ of the operations associated with step 120-3 are assigned to manual processes, and $2/10=20\%$ of the operations associated with step 120-5 are assigned to manual processes.

Figure 7:
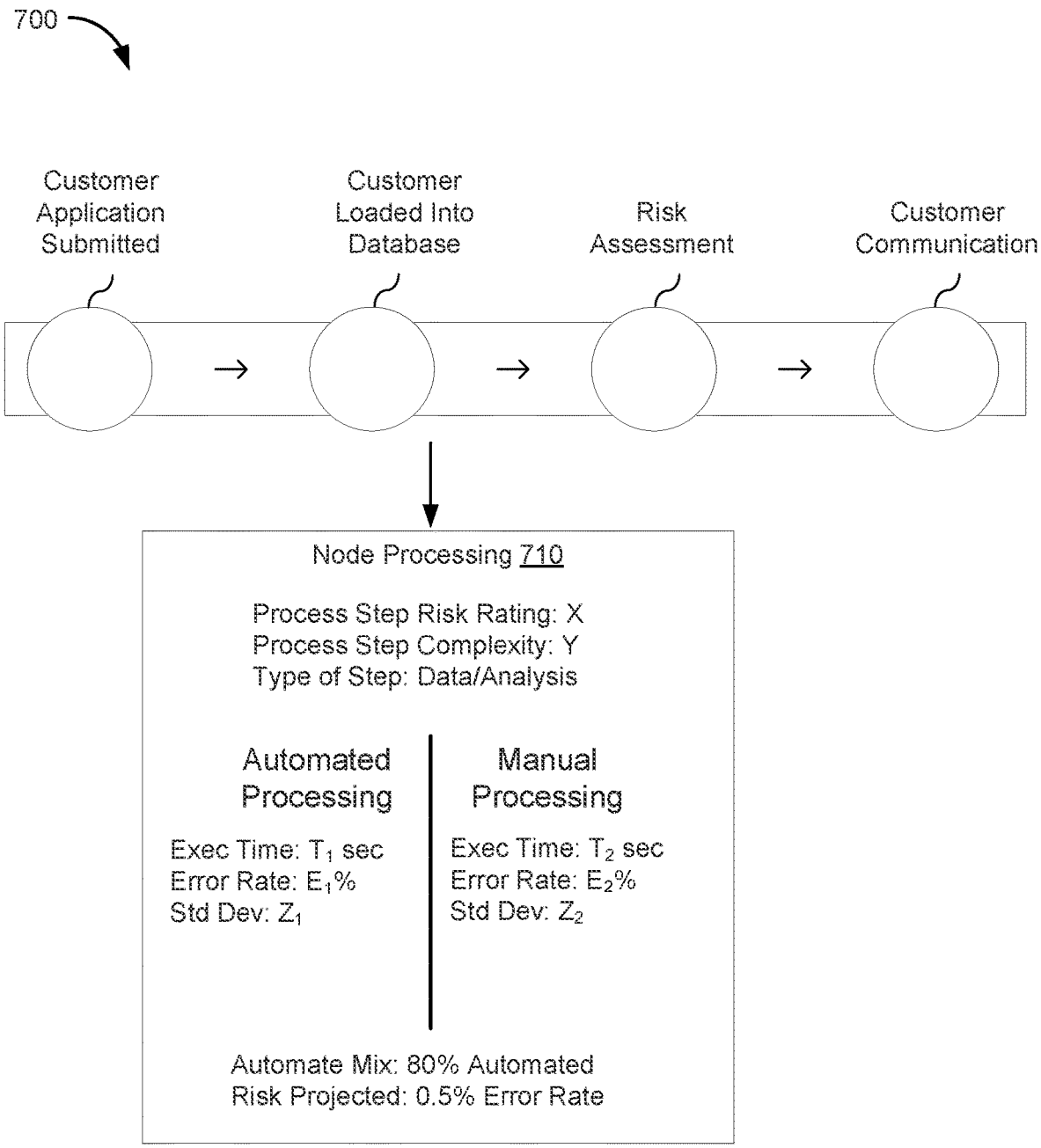
FIG. 7 provides an example project processing scenario in accordance with some implementations.

FIG. 7 provides an example project processing scenario 700 in accordance with some implementations. The example scenario 700 includes a process used by an example business for providing risk assessment services to customers of the business. Specifically, the example business project includes receiving a customer application, loading customer details into a database based on information learned from the customer application, assessing customer risk associated with various business practices of the customer, communicating results of the risk assessment to the customer, servicing the customer's account, and periodically reviewing the customer's risk assessments.

The processing system 200 (e.g., the separation module 222) separates the tasks described above into automated processes and/or manual processes. The separation module 222 uses machine learning to determine optimal nodes for executing discrete steps (also referred to as nodes). Additionally or alternatively, a user manually separates the project into the discrete tasks described above. The processing system 200 processes each step as described above, including evaluating risk, allocating operations to automated and manual processes based on the risk, and performing the automated and manual operations accordingly. For example, the processing system 200 evaluates (710) customer risk assessment by determining a risk rating X, a complexity rating Y, and a step description (e.g., data or analysis) for each of the processes. Based on one or more of these ratings, the processing system 200 determines an optimal allocation of automated and manual processes for each step. For example, a particular process may minimize error by having 80% of the operations allocated to automated processes, and the remaining 20% of the operations are allocated to manual processes (e.g., producing an expected 0.5% error rate).

In some implementations, the processing system 200 evaluates execution time, error rate, and/or standard deviation of the results of one or more of the automated processes and/or manual processes in evaluating performance of the processes. The processing system may optimize subsequent processing at each node based on the execution time, actual error rate, and/or standard deviation of the results from earlier processing.

Looking more specifically at the processing involved in the example scenario 700, the risk assessment process 710 evaluates risks and liability resulting from business operations of the customer. For example, the separation module 222 may separate the customer's business practices based on which regulations the practices invoke, and the allocation module 226 may assign a step processing module 228 to evaluate compliance for each practice. Here, each step corresponds to a business practice, and operations associated with each step correspond to compliance evaluations of activities comprising the practice. The processing system 200 evaluates risk and determines, based on the risks, which operations are best suited for automated processing and which operations are best suited for manual processing. For example, some business activities are best suited for automated compliance processing (e.g., low risk activities) and some activities are best suited for manual compliance processing (e.g., high risk activities). Automated risk and compliance processing may include one or more of the processes described in U.S. patent application Ser. No. 15/697,142

(e.g., paragraphs [0099] through [00112] and FIGS. 15-17). Manual risk and compliance processing may include any type of processing requiring user input (e.g., user review of automated results, or user evaluations completed without the support of machine intelligence). As part of a manual compliance review process, an investigator may personally review customer activities and consult compliance manuals during risk assessment.

Another example scenario for processing business projects includes contract review. One kind of contract, for example, is a non-disclosure agreement (NDA). The separation module 222 separates an NDA into individual sections, and the risk module 224 evaluates the risk involved in having automated versus manual review for each section of the NDA. In some implementations, the risk module 224 performs risk assessment based on training data. Alternatively, the risk module 224 performs risk assessments using pre-programmed rules-based logic. In evaluating each section, a first step may include recognizing all of the clauses (e.g., using a multiclass classifier). For sections of the NDA associated with high risk, the allocation module 226 may fully or partially allocate this step to manual processing, based on confidence values associated with outputs generated by machine learning models. As a specific example, a machine learning module trained to process NDA clauses regarding choice of forum may generate an output that has a confidence value of 95%. If the confidence value of the output does not meet (or exceed) a threshold confidence value for this step (as determined based on a risk assurance level or a level of risk of incorrectly evaluating forum clauses), the allocation module 226 determines that manual processing is required. In some implementations, the manual processing includes human review of an automated result (e.g., by requesting user input via a user interface). In some implementations, the relevant step processing module 228-n uses results of manual processing to train the machine learning module 230-n. For example, when a user determines that the forum for a particular NDA includes a particular jurisdiction, that result is fed back into the training model for the machine learning module responsible for evaluating choice of forum. By feeding the manual result back into the machine learning module, the accuracy of the machine learning module increases. As a result, even if the risk remains the same, the assurance threshold associated with the automated process is more easily met for subsequent executions of the relevant process.

Another example scenario for processing business projects includes the field of data preparation (e.g., converting data from a raw format into an alternative format that is better suited for data analysis). Data scientists often spend much of their time (sometimes up to 80%) in the data preparation phase rather than performing data science modeling. By allocating low-risk portions of step to automated processes as described herein, employee efficiency can increase. These observations apply to many professions. In many roles, there are several functions that have repetitive and time consuming tasks, which may distract employees from contributing true value (e.g., profit driving functions) to the business. The risk-based automation allocation processes described herein allow employees to significantly streamline their workflow by replacing time consuming low-level tasks with supervised automation.

Figure 8:
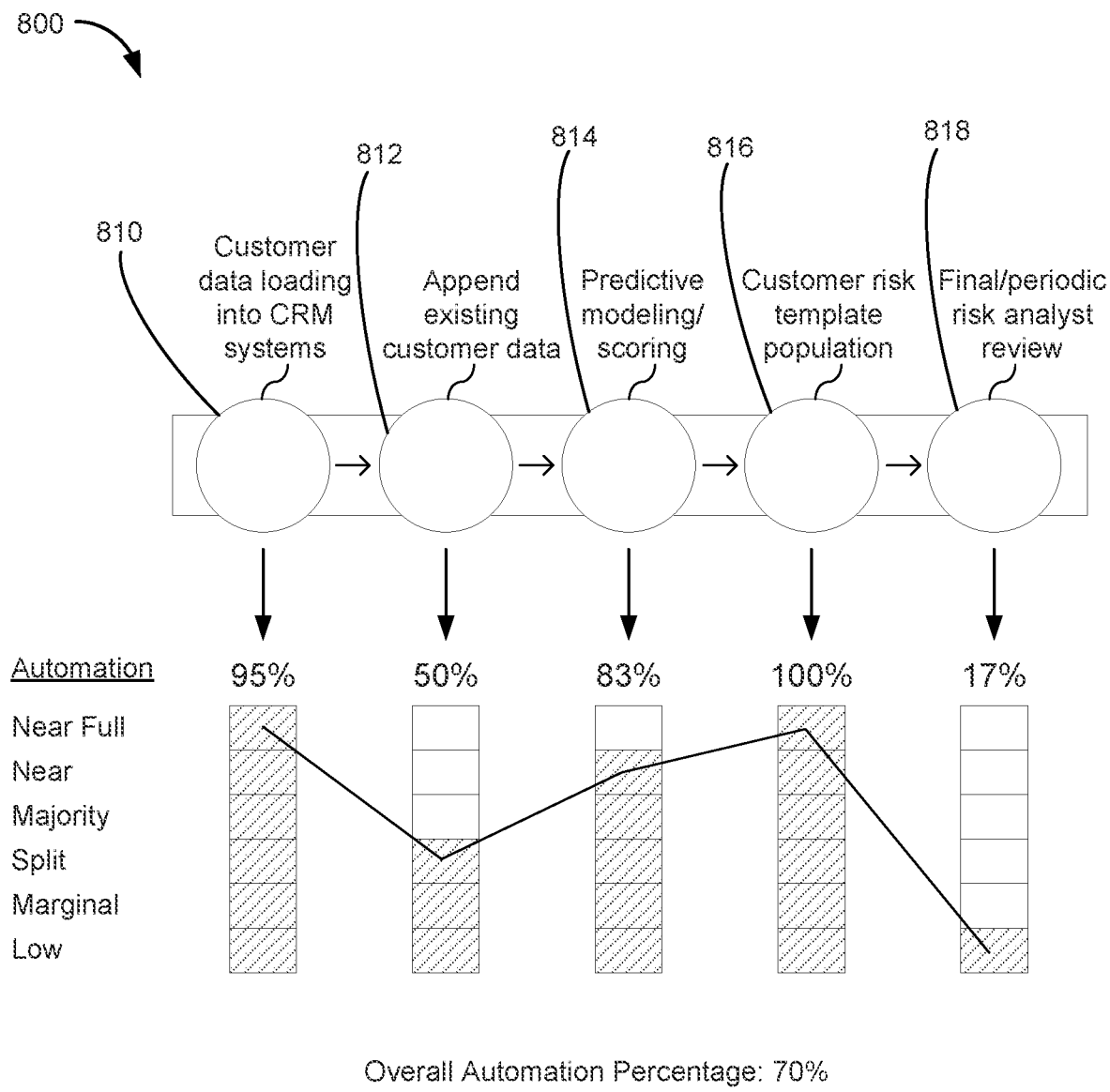
FIG. 8 provides an example allocation scenario in accordance with some implementations.

FIG. 8 provides an example allocation scenario 800 in accordance with some implementations. In the scenario 800, a business project includes steps for customer data loading into CRM systems, appending existing customer data, predictive modeling/scoring, customer risk template population, and final/periodic risk analyst review. For each step, the risk module 224 determines the level of risk associated with the step, and the allocation module 226 allocates operations based on the determined level of risk. For each step, the automated and manual processes account for 100% of the operations that need to be performed in order to complete the step. For steps associated with little to no risk, the respective operations can be virtually fully automated (designated "Near-Full Automation"). For steps associated with some levels of risk (e.g., 80% of the operations associated with the node can be completed by a machine with high confidence), the respective operations can be nearly automated (designated "Near Automation"). For slightly higher risk levels (e.g., above half of the step can be handled via automation), a majority of the respective operations can be automated (designed "Majority Automation"). As risk levels grow, an even mix of automation/manual intervention may be required (designated "Split Automation"). Automation can be used to augment manual processes (designated "Marginal Automation"), and eventually there will be a limited opportunity for automation (designated "Low Automation") when there is high risk.

Returning to the example allocation scenario 800, the customer data loading step 810 and the risk template population step 816 are associated with low to no risk, as they can typically be executed by automated processes with very high confidence. For the "Customer Data Loading" step 810, the allocation module 226 allocates 95% of the step to automated processes (nearly full automation), with only 5% manual processes. For the "Customer Risk Template" step 816, 100% of the step is automated. The predictive modeling and scoring step 814 is associated with slightly higher risk level, since the example business in this scenario uses the results of this process to perform the service for which it is being paid (i.e., assess customer risk). Therefore, the allocation module 226 allocates 83% of this step to automated processes (near automation). The "Appending Existing Customer Data" step 812 is associated with higher risk, and as a result, only half of the processes involved in this step can confidently be automated, given the elevated risk. Therefore, the allocating module 226 allocates 50% of this step to automated processes (split automation). Lastly, the risk analyst review step 818 is associated with the most risk, since it is the final step in the process and the results of this step depend on the accuracy of each proceeding step. Therefore, the allocating module 226 allocates only 17% of this step to automated processes (low automation). Tracking the automation at each step and summing the results, the overall automation percentage for the allocation scenario 800 is 70%.

Figure 9:
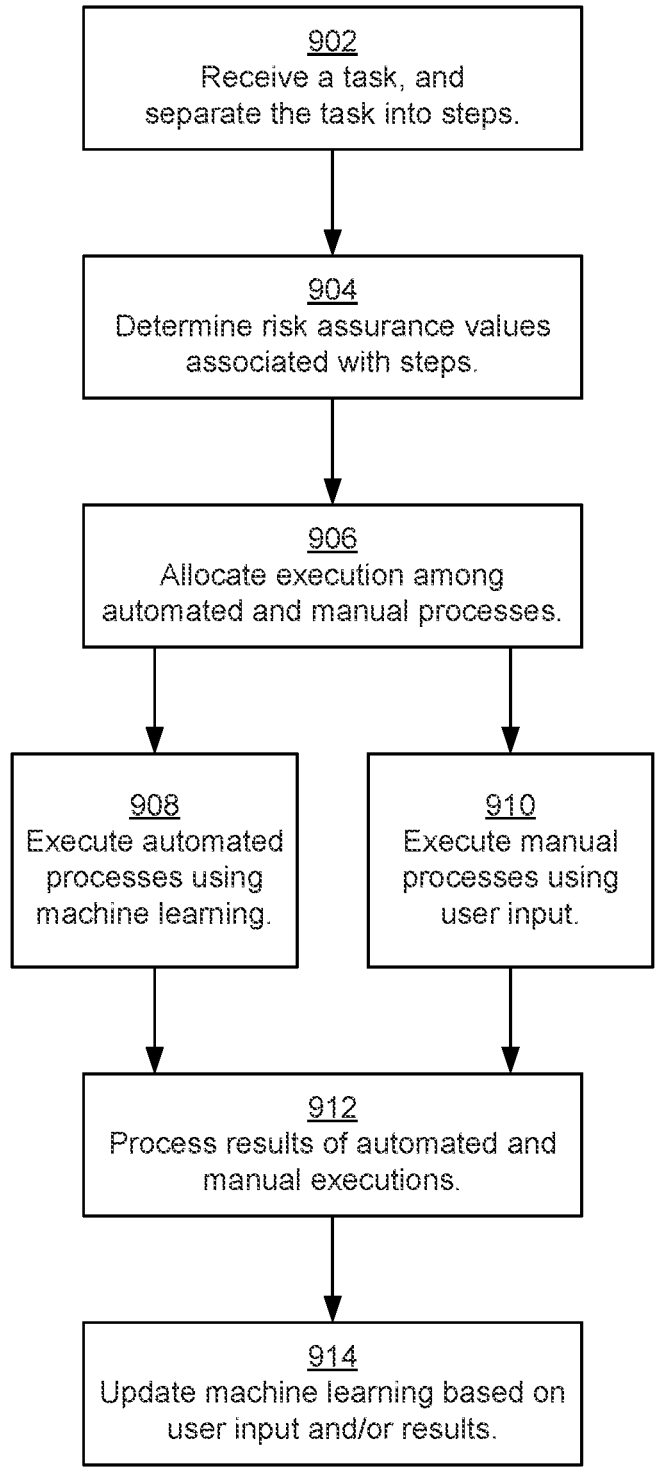
FIG. 9 is a flow diagram for an example method of processing steps in accordance with some implementations.
Figure 10A:
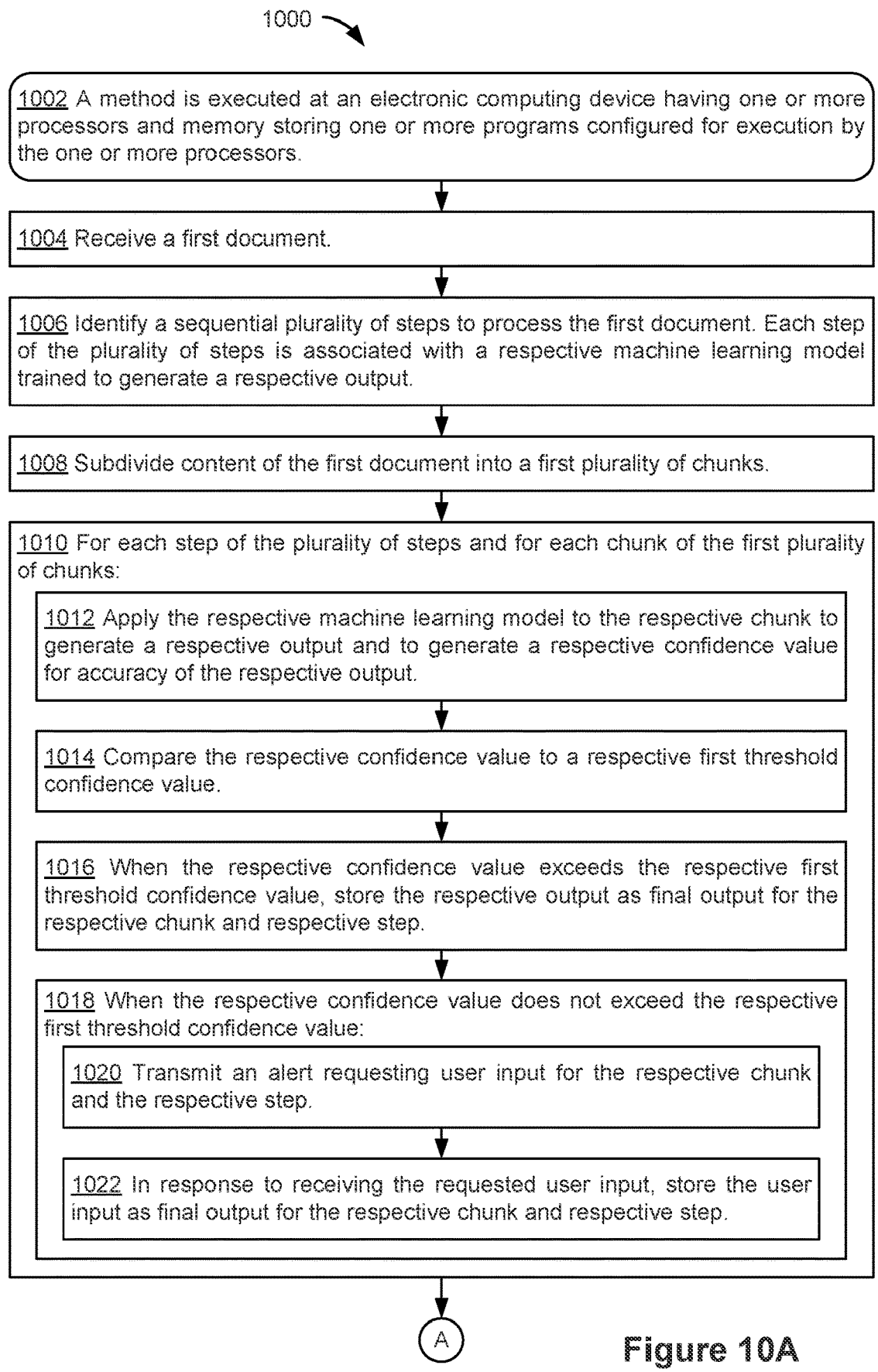
Figure 10B:
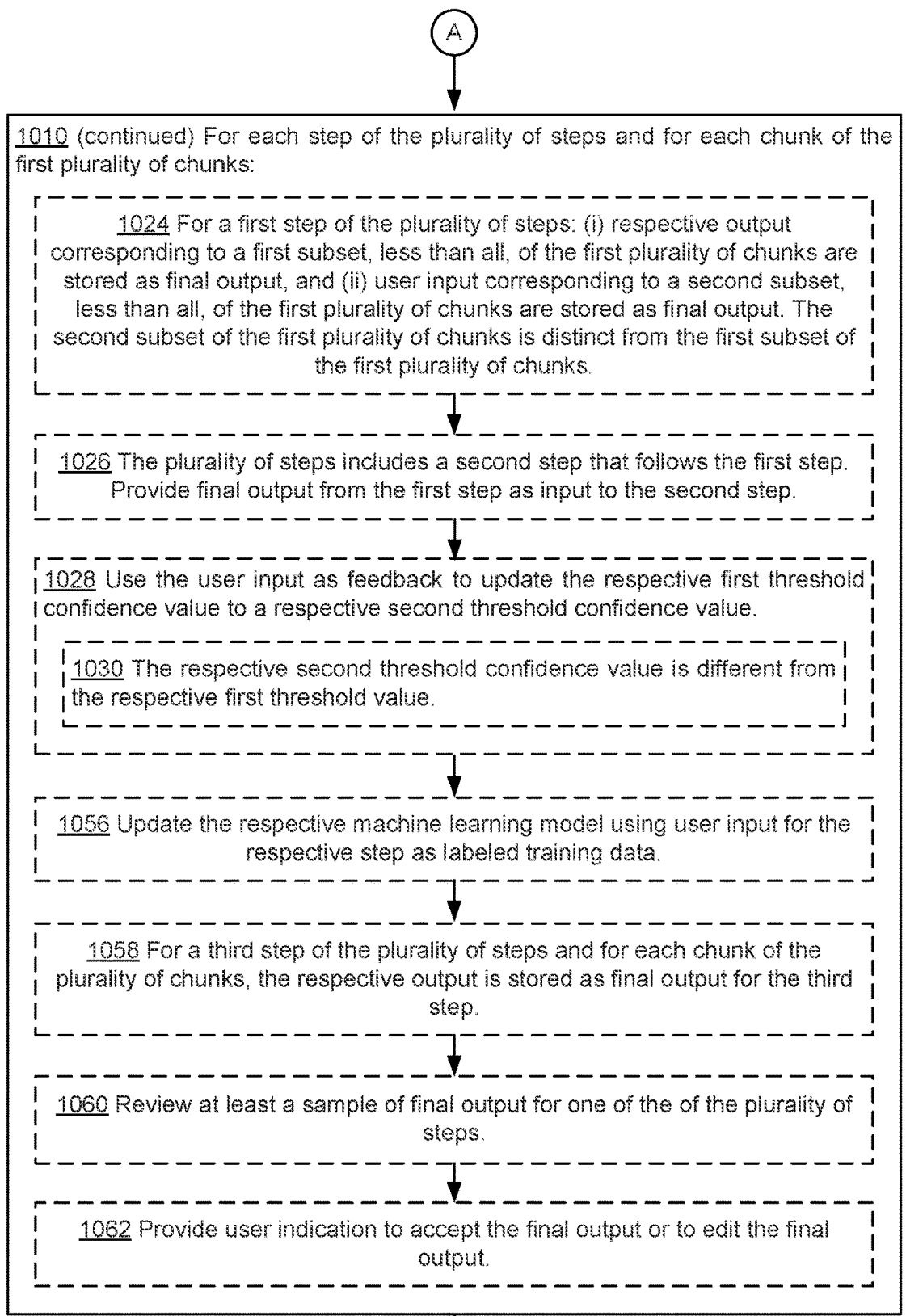
Figure 10C:
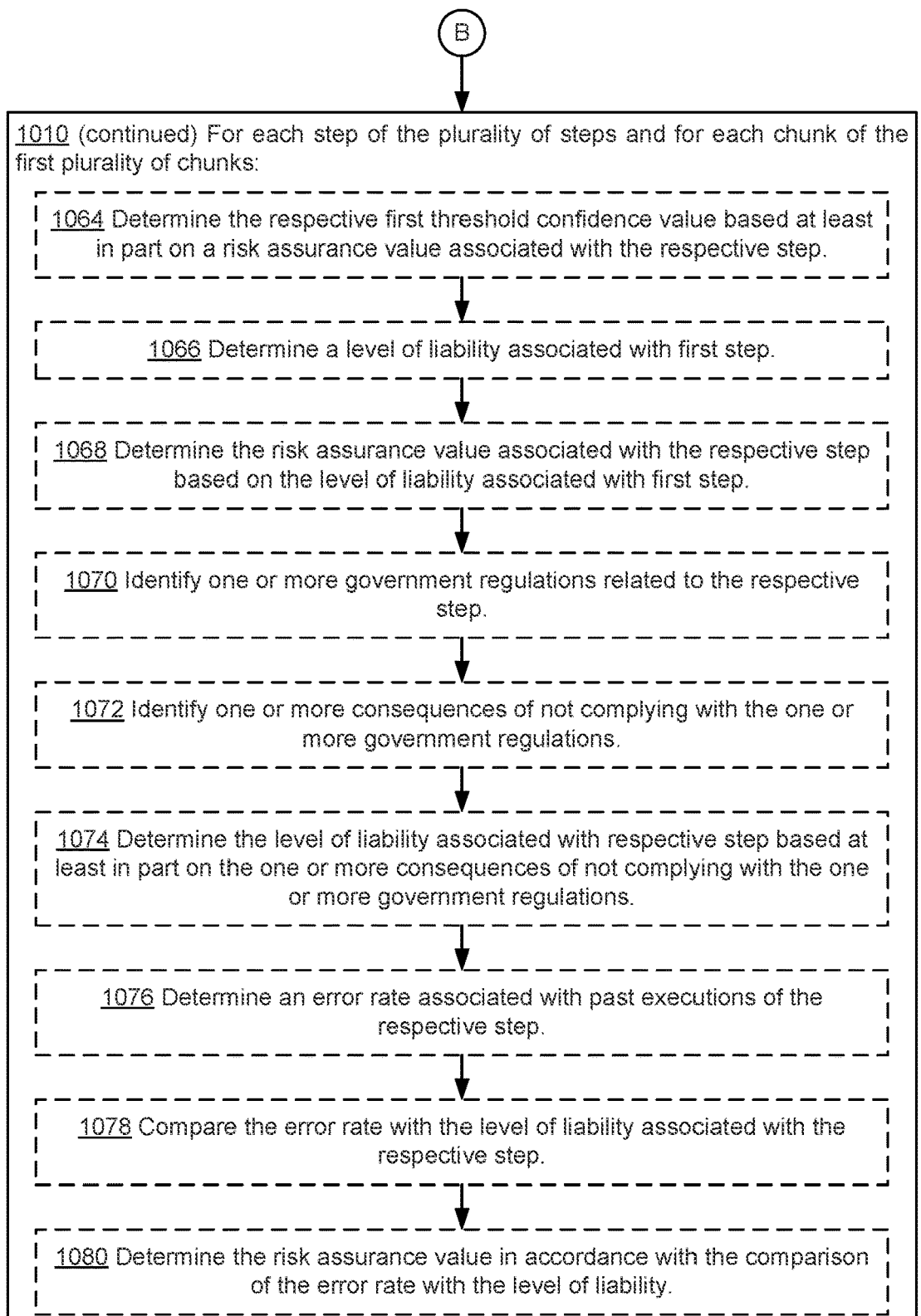
Figure 10D:
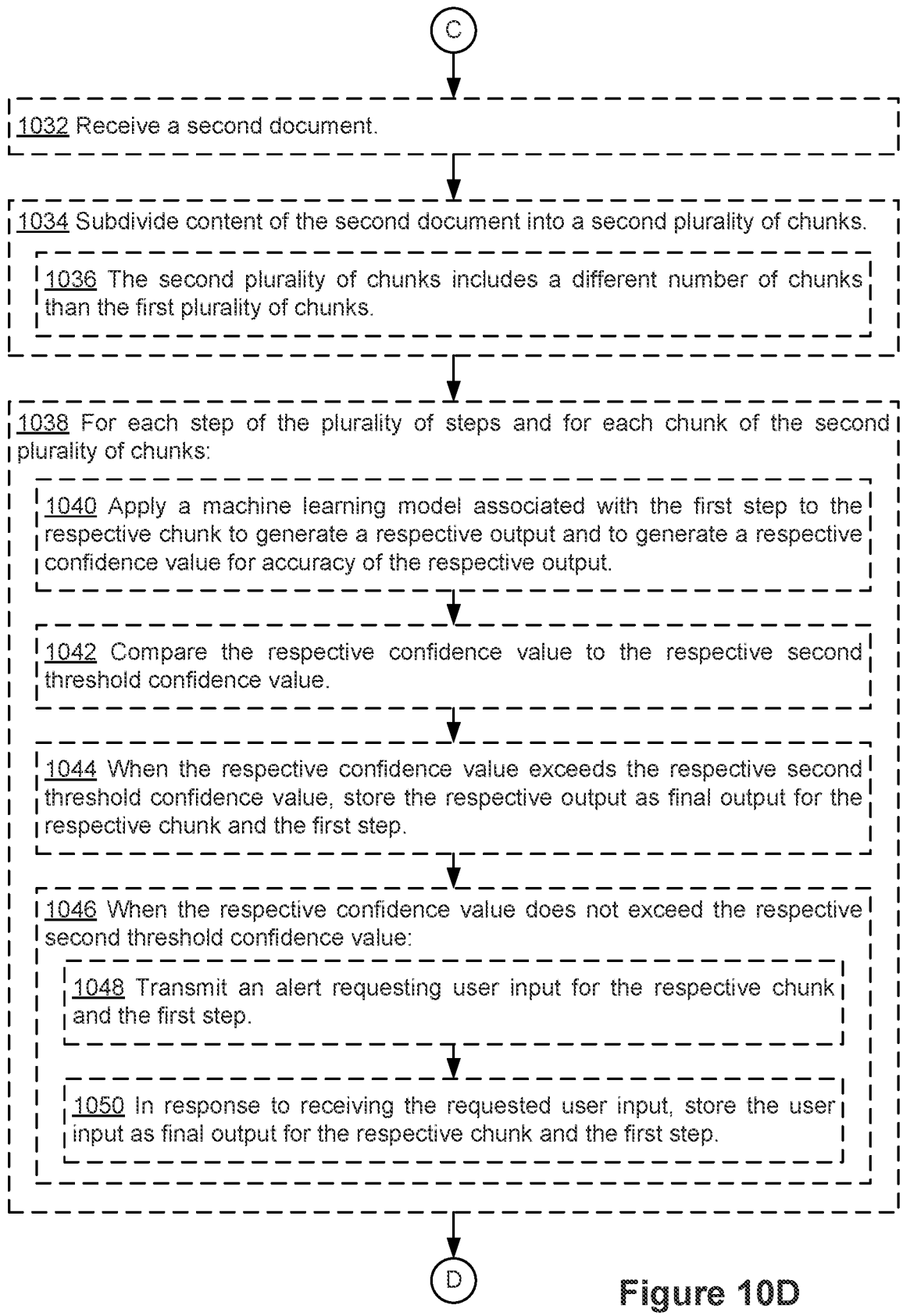

FIG. 9 is a flow diagram of an example method 900 for processing tasks in accordance with some implementations. The process may be performed at a processing system 200 having one or more processors and memory storing one or more programs configured for execution by the one or more processors. In some implementations, the processing system 200 includes one or more programs and memory storing one or more programs configured for execution by a plurality of processors, and the one or more programs include instructions for performing the process 900. In some implementations, a non-transitory computer readable storage medium stores one or more programs. The one or more programs include instructions which, when executed by a processing system 200 with one or more processors, cause the processing system 200 to perform the process 900.

The method begins when the processing system 200 receives (902) a task and separates (902) the task into a plurality of steps. In some implementations, a separation module 222 performs the separation process. Alternatively, a user manually separates the task into one or more steps. Example steps are described above with reference to scenarios 100, 300, 500, and 700 in FIGS. 3A-3G, 4, 5, 7, and 8.

The processing system 200 (e.g., the risk module 224) determines (904) risk assurance values associated with each step. In some implementations, the risk assurance value is based on the level of liability associated with the step. In some implementations, the level of liability is based on one or more regulations related to the step and the consequences for not meeting the one or more. In some implementations, the risk assurance value is based on the error rate associated with past executions of the step, and a comparison of the error rate with the level of liability. For example, higher error rates result in a greater proportion of operations being assigned to manual processes, but for low levels of liability, the proportion of operations assigned to manual processes may be lower.

The processing system 200 (e.g., allocation module 226) allocates (906) execution of portions of each step among (i) automated processes that use machine learning, and (ii) manual processes that require user input. The proportion of a given step that is allocated to automated processes versus manual processes depends on the level of risk (e.g., the risk assurance values) associated with the step. In some instances, a respective step has a plurality of operations, the completion of which is required in order to complete the step and/or obtain one or more results associated with the step. For these instances, a portion of the step includes a subset of the plurality of operations. The subset of the plurality of operations includes less than all of the plurality of operations if the step is allocated among two or more processes (e.g., split automation). The subset of the plurality of operations includes all of the plurality of operations if step is allocated to one process (e.g., full automation).

The processing system 200 (e.g., the step execution module 232) executes (908) the portion of the step allocated to automated processes using one or more machine learning processes.

The processing system 200 (e.g., the step execution module 232) executes (910) the portion of the step allocated to manual processes using user input (e.g., the manual portion 624-1 for the step 620-3 in FIG. 6). In some implementations, the processing system 200 generates a request for the required user input via a user interface, as described above with reference to FIG. 6 (e.g., the user interface 640-3). An example request for user input includes a request for user review of a result of one or more of the machine learning processes. This may occur when an operation is allocated to an automated process, but due to the level of risk associated with the step, human review is required. Another example request for user input includes a request for user completion of an operation not executed by an automated process. This may occur when an operation is allocated to a manual process due to the level of risk associated with the step.

The processing system 200 (e.g., the step execution module 232) completes each step by processing (912) results of the automated and manual executions.

The processing system 200 (e.g., the step processing module 228) updates (914) one or more of the machine learning processes based on at least a portion of the obtained user input (operation 910) and/or step results (operation 912). In some implementations, updating a machine learning process includes training the machine learning process using user input. As a result of the updating, subsequent automation allocation using the updated machine learning process may be increased, while subsequent manual allocation may be decreased. By increasing the allocation of step portions to automated processes in this way, the overall efficiency of the processing system 200 is increased without compromising accuracy or risk. In some implementations, updating a machine learning process includes training the machine learning process using user input and/or an output from the machine learning model 322. As a result of the updating, subsequent automation allocation using the updated machine learning model may be increased, while subsequent manual allocation may be decreased. By increasing the allocation of a step to automated processes in this way, the overall efficiency of the processing system 200 is increased without compromising accuracy or risk.

FIGS. 10A-10E provide a flow diagram of an example method 1000 for processing tasks in accordance with some implementations. The process 100 may be executed (1002) (e.g., performed) at a processing system 200 having one or more processors and memory storing one or more programs configured for execution by the one or more processors. In some implementations, a non-transitory computer readable storage medium stores one or more programs. The one or more programs include instructions which, when executed by a processing system 200 with one or more processors, cause the processing system 200 to perform the process 1000.

The method begins when the processing system 200 receives (1004) a first document 110 and identifies (1006) a sequential plurality of steps (e.g., the steps 120 or 320) to process the first document. Each step of the plurality of steps is associated with a respective machine learning model (e.g., the machine learning models 122 or 322), which is trained to generate a respective output (e.g., the output 330). In some implementations, a separation module 222 performs the separation process. Alternatively, a user manually separates the task into steps. Example steps are described above with reference to scenarios 300 in FIGS. 3A-3G.

The processing system 200 (e.g., step processing module 228) subdivides (1008) content of the first document into a first plurality of chunks. For example, the first document may be divided into a plurality of chunks where each of the chunks correspond to a portion of the document (e.g., by paragraph, by sentence, by line, or by chapter). For each step 320 of the plurality of steps and for each chunk of the first plurality of chunks (1010): the processing system 200 applies (1012) the respective machine learning model to the respective chunk to generate a respective output and to generate a respective confidence value for accuracy of the respective output. The processing system 200 compares (1014) the respective confidence value to a respective first threshold confidence value. When the respective confidence value exceeds the respective first threshold confidence value, the processing system 200 stores (1016) the respective output as final output for the respective chunk and respective step. When the respective confidence value does not exceed the respective first threshold confidence value, the processing system 200 transmits (1020) an alert requesting user input for the respective chunk and the respective step, and in response to receiving the requested user input, the processing system 200 stores (1022) the user input as final output for the respective chunk and respective step. A detailed example is provided with respect to FIGS. 3A-3G. The document 310 is subdivided into chunks (e.g., outputs 310-2, subdivided by data field) in step 320-2. At each step 320, the outputs 330 for the step are compared to a threshold confidence value 334 for the step to determine if user input is required prior to accepting and storing the outputs 330 (from the machine learning model 322) as final outputs for the step 320. In some implementations, the document is subdivided into chunks in a step that is distinct from the plurality of steps. In some implementations, the document is subdivided into chunks as part of one of the plurality of steps.

In some implementations, for a first step of the plurality of steps (1024): (i) respective outputs corresponding to a first subset, less than all, of the first plurality of chunks (e.g., outputs 330) are stored as final output (e.g., confidence values for chunks in the first subset are above the threshold confidence value), and (ii) user input 338 corresponding to a second subset, less than all, of the first plurality of chunks (e.g., outputs 330) are stored as final output (e.g., confidence values for chunks in the second subset are above the threshold confidence value). The second subset of the first plurality of chunks is distinct from the first subset of the first plurality of chunks. FIG. 6 illustrates an example where a first subset of outputs 330 (e.g., portion 624-1) is stored as final outputs 366 for the step 120-3 (without requiring user input), and a second subset of outputs 330 (e.g., portion 624-2), which required user input 338, and the user inputs 338 are stored as final outputs 366.

In some implementations, the plurality of steps includes a second step that follows the first step, and the processing system 200 provides (1026) final outputs from the first step as inputs to the second step. FIG. 3D illustrates an example where final outputs 336-2 for the step 320-2 are provided as inputs to step 320-3. The machine learning model 322-2 associated with the step 320-3 is applied to each of the final outputs 336-2 to generate outputs 330-3 for the step 320-3.

In some implementations, the processing system 200 uses (1028) the user input 338 as feedback to update the respective first threshold confidence value 334 to the respective second threshold confidence value (e.g., the threshold confidence value is adjusted or changed based on the user input 338).

In some implementations, the respective second threshold confidence value is (1030) different from the respective first threshold value. For example, a threshold confidence value for step 320-2 while document 310-1 is processed is different from a threshold confidence value for step 320-2 while document 310-m is processed.

In some implementations, the processing system 200 updates (1056) the respective machine learning model using user input for the respective step as labeled training data.

In some implementations, for a third step of the plurality of steps and for each chunk of the plurality of chunks (e.g., all outputs 330), the respective output is stored (1058) as final output for the third step. For example, FIG. 3B illustrates an example where every output 330-1 from the machine learning model 322-1 is stored as the final output 336-1 for the step 320-1.

In some implementations, the task includes a step that requires a user (e.g., human) to review (1060) at least a sample of final output for one of the of the plurality of steps and to provide (1062) a user indication to accept the final output or to edit the final output. An example of a manual review step 320-7 is provided in FIG. 5.

In some implementations, the processing system 200 (e.g., the risk module 224) determines (1064) the respective first threshold confidence value based at least in part on a risk assurance value associated with the respective step.

In some implementations, the processing system 200 (e.g., the risk module 224) determines (1066) a level of liability associated with first step.

In some implementations, the processing system 200 (e.g., the risk module 224) determines (1068) the risk assurance value associated with the respective step based on the level of liability associated with first step.

In some implementations, the processing system 200 (e.g., the risk module 224) identifies (1070) one or more government regulations related to the respective step, and identifies (1072) one or more consequences of not complying with the one or more government regulations. The processing system 200 (e.g., the risk module 224) also determines (1074) the level of liability associated with respective step based at least in part on the one or more consequences of not complying with the one or more government regulations.

In some implementations, the processing system 200 (e.g., the risk module 224) determines (1076) an error rate associated with past executions of the respective step and compares (1078) the error rate with the level of liability associated with the respective step. The processing system 200 (e.g., the risk module 224) determines (1080) the risk assurance value in accordance with the comparison of the error rate with the level of liability. For example, higher error rates result in a greater proportion of operations being assigned to manual processes, but for low levels of liability, the proportion of operations assigned to manual processes may be lower.

In some implementations, the processing system 200 receives (1032) a second document (e.g., document 310-m) and subdivides (1034) content of the second document into a second plurality of chunks. For each step of the plurality of steps and for each chunk of the second plurality of chunks (1038): the processing system 200 (e.g., step execution module 232) applies (1040) the respective machine learning model to the respective chunk to generate a respective output and to generate a respective confidence value for accuracy of the respective output, and compares (1044) the respective confidence value to a respective second threshold confidence value. In accordance with a determination that the respective confidence value exceeds the respective second threshold confidence value, the processing system 200 stores (1044) the respective output as final output for the respective chunk and respective step. In accordance with a determination that the respective confidence value does not (1046) exceed the respective second threshold confidence value. the processing system 200 transmits (1048) an alert requesting user input for the respective chunk and the respective step, and in response to receiving the requested user input, the processing system 200 stores (1050) the user input as final output for the respective chunk and respective step. A detailed example of executing steps 320 of a task are provided with respect to steps 3A-3G, and an example of executing steps 320 to two different documents (310-1 and 310-m) is provided with respect to FIG. 4.

In some implementations, the second plurality of chunks includes (1036) a different number of chunks than the first plurality of chunks. For example, document 310-1 is subdivided into three chunks (e.g., outputs 330-2A, 330-2B, and 330-2C) in step 320-2, and document 310-m is subdivided into five chunks (e.g., outputs 330-2A' through 330-2E') in step 320-2.

In some implementations, for the first step of the plurality of steps (1052): (i) respective outputs corresponding to a first subset, less than all, of the second plurality of chunks are stored as final output, and (ii) user input corresponding to a second subset, less than all, of the second plurality of chunks are stored as final output. The second subset of the second plurality of chunks is distinct from the first subset of the second plurality of chunks. The first subset of the first plurality of chunks includes a different number of chunks than the first subset of the second plurality of chunks. An example is provided in FIG. 4 where the first document 310-1 and the second document 310-*m* are subdivided into a different number of chunks (outputs 330-2 for document 310-1 and outputs 330-2' for document 310-*m*), the number of (and the percentage of) the outputs allocated for manual processing differs between the two documents.

In some implementations, the first subset of the second plurality of chunks includes (1054) more chunks than the first subset of the first plurality of chunks. FIG. 4 provides an example where for a same step 320, more outputs for document 310-1 are designated for manual processing compared to the number (and/or the percentage) of outputs for document 310-*m* that are designated for manual processing.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Additionally, it will be understood that, although the terms "first" and "second" may be used herein to describe various elements, these elements should not be limited by these terms. These terms are only used to distinguish one element from another.

As used herein, the term "if" means "when" "upon," "in response to determining," "in response to detecting," or "in accordance with a determination that," depending on the context. Similarly, the phrase "if it is determined" or "if [a stated condition or event] is detected" means "upon determining," "in response to determining," "upon detecting [the stated condition or event]," "in response to detecting [the stated condition or event]," or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at an electronic computing device having one or more processors and memory storing one or more programs configured for execution by the one or more processors:
   receiving a first document;
   identifying a sequential plurality of steps to process the first document, wherein each step of the plurality of steps is associated with a respective machine learning model trained to generate a respective output;
   subdividing content of the first document into a first plurality of chunks; and
   for each step of the plurality of steps and for each chunk of the first plurality of chunks:
   determining a respective first threshold confidence value for the respective step based at least in part on a level of liability associated with the respective step;
   applying the respective machine learning model to the respective chunk to generate (i) a respective output corresponding to the respective chunk and (ii) a respective confidence value for accuracy of the respective output;
   comparing the respective confidence value to a respective first threshold confidence value;
   in accordance with a determination that the respective confidence value exceeds the respective first threshold confidence value, storing the respective output as final output for the respective chunk and respective step; and
   in accordance with a determination that the respective confidence value does not exceed the respective first threshold confidence value:
   transmitting an alert requesting user input for the respective chunk and the respective step; and
   in response to receiving the requested user input, storing the user input as final output for the respective chunk and respective step.

2. The method of claim 1, wherein, for a first step of the plurality of steps:
   respective output corresponding to a first subset, less than all, of the first plurality of chunks are stored as final output;
   user input corresponding to a second subset, less than all, of the first plurality of chunks are stored as final output; and
   the second subset of the first plurality of chunks is distinct from the first subset of the first plurality of chunks.

3. The method of claim 2, further comprising:
   receiving a second document;
   subdividing content of the second document into a second plurality of chunks; and
   for each step of the plurality of steps and for each chunk of the second plurality of chunks:
   applying a machine learning model associated with the first step to the respective chunk to generate a respective output and to generate a respective confidence value for accuracy of the respective output;
   comparing the respective confidence value to a respective second threshold confidence value;
   in accordance with a determination that the respective confidence value exceeds the respective second threshold confidence value, storing the respective output as final output for the respective chunk and the first step; and in accordance with a determination that the respective confidence value does not exceed the respective second threshold confidence value:

transmitting an alert requesting user input for the respective chunk and the first step; and in response to receiving the requested user input, storing the user input as final output for the respective chunk and the first step.

4. The method of claim 3, wherein the respective second threshold confidence value is different from the respective first threshold confidence value.

5. The method of claim 4, further comprising:
using the user input as feedback to update the respective first threshold confidence value to the respective second threshold confidence value.

6. The method of claim 3, wherein, for the first step of the plurality of steps:
respective output corresponding to a first subset, less than all, of the second plurality of chunks are stored as final output;
user input corresponding to a second subset, less than all, of the second plurality of chunks are stored as final output;
the second subset of the second plurality of chunks is distinct from the first subset of the second plurality of chunks; and
the first subset of the first plurality of chunks includes a different number of chunks than the first subset of the second plurality of chunks.

7. The method of claim 6, wherein the first subset of the second plurality of chunks includes more chunks than the first subset of the first plurality of chunks.

8. The method of claim 3, wherein the second plurality of chunks includes a different number of chunks than the first plurality of chunks.

9. The method of claim 2, wherein the plurality of steps further includes a second step that follows the first step, the method further comprising:
providing final output from the first step as input to the second step.

10. The method of claim 1, further comprising:
updating the respective machine learning model using user input for the respective step as labeled training data.

11. The method of claim 1, wherein for a third step of the plurality of steps and for each chunk of the first plurality of chunks, the respective output is stored as final output for the third step.

12. The method of claim 1, further comprising:
reviewing at least a sample of final output for one of the of the plurality of steps; and
providing user indication to accept the final output or to edit the final output.

13. The method of claim 1, further comprising:
determining the respective first threshold confidence value based at least in part on a risk assurance value associated with the respective step.

14. The method of claim 13, further comprising:
determining the risk assurance value associated with the respective step based on the level of liability associated with respective step.

15. The method of claim 1, further comprising:
identifying one or more government regulations related to the respective step;

identifying one or more consequences of not complying with the one or more government regulations; and
determining the level of liability associated with respective step based at least in part on the one or more consequences of not complying with the one or more government regulations.

16. The method of claim 13, further comprising:
determining an error rate associated with past executions of the respective step;
comparing the error rate with the level of liability associated with the respective step; and
determining the risk assurance value in accordance with comparing the error rate with the level of liability.

17. A computer system, comprising:
one or more databases;
an electronic device having a display and memory storing one or more programs executable by the electronic device, the one or more programs including instructions for:
receiving a first document;
identifying a sequential plurality of steps to process the first document, wherein each step of the plurality of steps is associated with a respective machine learning model trained to generate a respective output;
subdividing content of the first document into a first plurality of chunks; and
for each step of the plurality of steps and for each chunk of the first plurality of chunks:
determining a respective first threshold confidence value for the respective step based at least in part on a level of liability associated with the respective step;
applying the respective machine learning model to the respective chunk to generate (i) a respective output corresponding to the respective chunk and (ii) a respective confidence value for accuracy of the respective output;
comparing the respective confidence value to a respective first threshold confidence value;
in accordance with a determination that the respective confidence value exceeds the respective first threshold confidence value, storing the respective output as final output for the respective chunk and respective step; and
in accordance with a determination that the respective confidence value does not exceed the respective first threshold confidence value:
transmitting an alert requesting user input for the respective chunk and the respective step; and
in response to receiving the requested user input, storing the user input as final output for the respective chunk and respective step.

18. The computer system of claim 17, wherein, for a first step of the plurality of steps:
respective output corresponding to a first subset, less than all, of the first plurality of chunks are stored as final output;
user input corresponding to a second subset, less than all, of the first plurality of chunks are stored as final output; and
the second subset of the first plurality of chunks is distinct from the first subset of the first plurality of chunks.

19. The computer system of claim 17, wherein the one or more programs further comprise instructions for updating the respective machine learning model using user input for the respective step as labeled training data.

20. A non-transitory computer-readable storage medium having memory storing one or more programs executable by an electronic device, the one or more programs including instructions for:
- receiving a first document;
- identifying a sequential plurality of steps to process the first document, wherein each step of the plurality of steps is associated with a respective machine learning model trained to generate a respective output;
- subdividing content of the first document into a first plurality of chunks; and
- for each step of the plurality of steps and for each chunk of the first plurality of chunks:
  - determining a respective first threshold confidence value for the respective step based at least in part on a level of liability associated with the respective step;
  - applying the respective machine learning model to the respective chunk to generate (i) a respective output corresponding to the respective chunk and (ii) a respective confidence value for accuracy of the respective output;
  - comparing the respective confidence value to a respective first threshold confidence value;
  - in accordance with a determination that the respective confidence value exceeds the respective first threshold confidence value, storing the respective output as final output for the respective chunk and respective step; and
  - in accordance with a determination that the respective confidence value does not exceed the respective first threshold confidence value:
    - transmitting an alert requesting user input for the respective chunk and the respective step; and
    - in response to receiving the requested user input, storing the user input as final output for the respective chunk and respective step.

\* \* \* \* \*